(12) United States Patent  
Asaga et al.

(10) Patent No.: US 9,166,453 B2  
(45) Date of Patent: Oct. 20, 2015

(54) SPLIT CORE STATOR WITH TERMINAL ACCOMMODATING RESIN BOX

(71) Applicant: AISIN SEIKI KABUSHIKI KAISHA, Kariya-shi (JP)

(72) Inventors: Takashi Asaga, Toyota (JP); Toshiya Sugiyama, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 282 days.

(21) Appl. No.: 13/711,840

(22) Filed: Dec. 12, 2012

(65) Prior Publication Data

US 2013/0154427 A1    Jun. 20, 2013

(30) Foreign Application Priority Data

Dec. 14, 2011    (JP) .................................. 2011-273227

(51) Int. Cl.
 *H02K 3/38* (2006.01)
 *H02K 3/50* (2006.01)
 *H02K 3/52* (2006.01)
 *H02K 1/12* (2006.01)

(52) U.S. Cl.
 CPC .. *H02K 3/38* (2013.01); *H02K 3/50* (2013.01); *H02K 3/52* (2013.01); *H02K 3/522* (2013.01); *H02K 1/12* (2013.01); *H02K 2203/09* (2013.01)

(58) Field of Classification Search
 CPC ............. H02K 3/38; H02K 3/50; H02K 3/52; H02K 3/46; H02K 3/32; H02K 1/12; H02K 3/48; H02K 3/487; H02K 5/22; H02K 5/225
 USPC ............. 310/71, 43, 215, 214, 194, 216, 260, 310/270, 406, 407
 See application file for complete search history.

(56) References Cited

U.S. PATENT DOCUMENTS

| | | | | |
|---|---|---|---|---|
| 5,410,202 A | * | 4/1995 | Roger et al. ..................... | 310/71 |
| 2004/0056552 A1 | * | 3/2004 | Miya et al. ..................... | 310/216 |
| 2005/0012413 A1 | * | 1/2005 | Bott et al. ........................ | 310/71 |
| 2009/0127971 A1 | * | 5/2009 | Ishizeki et al. ................ | 310/218 |
| 2010/0244597 A1 | * | 9/2010 | Sugiyama et al. .............. | 310/71 |
| 2013/0221770 A1 | * | 8/2013 | Yokogawa ...................... | 310/43 |

FOREIGN PATENT DOCUMENTS

| | | |
|---|---|---|
| JP | 4073705 B2 | 4/2008 |
| JP | 2010-233405 A | 10/2010 |

* cited by examiner

*Primary Examiner* — Terrance Kenerly
*Assistant Examiner* — Alexander Singh
(74) *Attorney, Agent, or Firm* — Buchanan Ingersoll & Rooney PC

(57) ABSTRACT

A stator of a rotary electrical machine, includes a core unit configured by a plurality of core assemblies each including a laminated steel plate, an insulator, and a coil; a bus ring facing the core unit; and an accommodating box arranged at the insulator, accommodating an end portion of the coil, and including radially inward and outward engaged portions, the insulator including radially inward and outward extending portions, the radially inward extending portion including a radially inward engagement portion about which the accommodating box rotates in a radial direction of the core unit from an initial attachment position to an attached position and which engages with the radially inward engaged portion, the radially outward extending portion including a radially outward engagement portion which engages with the radially outward engaged portion in accordance with the rotation of the accommodating box to move the accommodating box in the radial direction.

6 Claims, 12 Drawing Sheets

SPLIT CORE STATOR WITH TERMINAL ACCOMMODATING RESIN BOX

CROSS REFERENCE TO RELATED APPLICATIONS

This application is based on and claims priority under 35 U.S.C. §119 to Japanese Patent Application 2011-273227, filed on Dec. 14, 2011, the entire content of which is incorporated herein by reference.

TECHNICAL FIELD

This disclosure relates to a stator of a rotary electrical machine for driving a rotor facing the stator in a radial direction.

BACKGROUND DISCUSSION

A known stator of a rotary electrical machine is disclosed in, for example, JP4073705B (which will be hereinafter referred to as Reference 1). The stator according to Reference 1 includes plural split cores (core assemblies) around each of which a coil is wound and which are supported by a housing so as to form an annular shape. In the known stator, low-voltage-side and high-voltage-side terminals are attached to insulators insulating a laminated steel plate. Low-voltage-side and high-voltage-side end portions of the coil are connected to the low-voltage-side terminal and the high-voltage-side terminal, respectively. In addition, the low-voltage-side end portions of the respective coils of the split cores adjoining one another are electrically connected to one another by the low-voltage-side terminals. A groove portion, which is configured by a pair of vertical walls arranged next to each other so as to extend in a circumferential direction of the stator, is formed at an upper portion at an inner or outer circumferential side of each of the insulators that configure the split core. The grooves formed at the respective split cores adjoining one another are connected to one another, thereby forming a connected annular groove continuously extending in the circumferentially direction of the stator. The connected annular groove is filled with an insulating resin material.

In the stator according to Reference 1, the insulating resin material is filled in the connected annular groove formed at the inner or outer circumferential side of the insulator, entirely along the circumferential direction. Accordingly, an amount of the insulating resin material filled (used) in the connected annular groove is large, therefore increasing manufacturing costs of the stator. Further, a space filled with the insulating resin material is large; therefore, it is difficult for small portions of the connected annular groove to be filled with the insulating resin material. Accordingly, the connected annular groove may not be surely or fully filled with the insulating resin material, resulting in an insulation failure of ends of the coil. Consequently, an appropriate operation of the rotary electrical machine may be inhibited. JP2010-233405A (which will be hereinafter referred to as Reference 2) discloses a known stator of a rotary electrical machine, which avoids an inappropriate operation of a rotary electrical machine because of the foregoing insulation failure (see FIGS. 12 and 13).

As illustrated in FIGS. 12 and 13, a stator 1Z disclosed in Reference 2 includes a core unit 3Z in which plural split cores 4Z are arranged in an annular shape. Each of the plural split cores 4Z includes laminated steel plates 40, an insulator 41Z partially insulating the laminated steel plates 40, a coil 42 wound around the insulator 41Z, and a neutral point terminal 44. Low-voltage-side end portions 421 of the coils 42 respectively wound around the split cores 4Z are connected to one another by the neutral point terminals 44. A bus ring 5 retaining wire segments 53$u$, 53$v$, 53$w$ is attached to an outer circumferential side of the core unit 3Z; thereby, the wire segments 53$u$, 53$v$, 53$w$ are connected via electricity supply terminals 54 to high-voltage-side end portions 422 of the coils 42, respectively.

Radially outward terminal-accommodating boxes 511 opened to an upper side of the stator 1Z and to the split cores 4Z is provided in a position facing the split cores 4Z that are arranged at an upper side of the bus ring 5 in a state where the bus ring 5 is attached to the core unit 3Z. Resin boxes 43Z are arranged at an upper side of the insulators 41Z of the split cores 4Z, respectively. The resin boxes 43Z include radially inward terminal-accommodating boxes 431Z, respectively, opened to the upper side of the stator 1Z and to the radially outward terminal-accommodating boxes 511. The radially outward terminal-accommodating boxes 511 and the radially inward terminal-accommodating boxes 431Z are aligned to along a circumferential direction of the core unit 3Z so as to face one another, thereby forming plural terminal accommodating boxes 6Z opened to the upper side of the stator 1Z. A radially inward flange 411Z and a radially outward flange 413Z that extend in a vertical direction of the stator 1Z and in the circumferential direction of the core unit 3Z are formed at the insulator 41Z so as to be positioned at an inner circumferential side of the core unit 3Z and at the outer circumferential side of the core unit 3Z in a state where the coil 42 of the insulator 41Z is arranged between the radially inward and outward sides of the core unit 3Z. Each of the resin boxes 43Z is supported from a lower side thereof by the radially inward flange 411Z and the radially outward flange 413Z.

The low-voltage-side end portion 421 of the coil 42 is arranged at an upper side of side walls of the radially inward terminal-accommodating box 431Z so as to extend between the side walls facing each other in a circumferential direction of the radially inward terminal-accommodating box 431Z. A pair of wire engagement portions 414Z protruding toward an upper side of the split core 4Z and separating from each other in the circumferential direction of the core unit 3Z is formed at an upper end of the radially outward flange 413Z of the insulator 41Z. The high-voltage-side end portion 422 of the coil 42 is provided so as to extend between the pair of wire engagement portions 414Z. An insulating resin material is filled in each of the terminal accommodating boxes 6Z in a state where a connected portion between the neutral point terminal 44 and the low-voltage-side end portion 421 of the coil 42 and a connected portion between the electricity supply terminal 54 and the high-voltage-side end portion 422 of the coil 42 are accommodated in the terminal accommodating box 6Z. Two protruding walls 438Z protruding toward a lower side of the split core 4 are formed at a radially inward side of a bottom portion 435Z of the resin box 43Z. Engagement projections 438Za protruding radially inwardly are formed at respective lower ends of the protruding walls 438Z. Two engagement holes 412Z are formed at an upper portion of the radially inward flange 411Z of the insulator 41Z so as to penetrate through the radially inward flange 411Z. The engagement projections 438Za of the protruding walls 438Z, respectively, are inserted in the engagement holes 412Z; thereafter, the resin box 43Z is rotated about the both engagement holes 412Z from the upper side to the lower side of the split core 4. Therefore, the resin box 43Z is attached to the insulator 41Z. The bottom portion 435Z of the radially inward terminal-accommodating box 431Z includes an extending bottom portion 436Z that protrudes radially outwardly from the bottom portion 435Z. In a state where the resin box 43Z is in an attached position relative to the split core 4Z, the extending bottom portion 436Z is located adjacent to a bottom portion 521 (holding flange) of the radially outward terminal-accommodating box 511 to the extent that an outflow of the insulating resin material may not occur.

According to the stator 1Z disclosed in Reference 2, the resin box 43Z is rotated or moved from the upper side to the lower side of the split core 4Z to be therefore attached to the insulator 41Z. In such attaching method to attach the resin box 43Z to the insulator 41Z, an appropriate clearance needs to be provided between the extending bottom portion 436Z of the radially inward terminal-accommodating box 431Z and the bottom portion 521 of the radially outward terminal-accommodating box 511. For example, in a case where the clearance is small, the resin box 43Z may not be smoothly or easily attached to the insulator 41Z because of a contact between components. Further, for example, in a case where the clearance is large, the insulating resin material may flow out from the clearance.

In addition, according to the stator 1Z disclosed in Reference 2, the attaching operation of the resin box 43Z to the insulator 41Z is conducted in a state where the high-voltage-side end portion 422 of the coil 42 is positioned to extend between the pair of wire engagement portions 414Z. Therefore, it is necessary for the resin box 43Z to be moved from the upper side to the lower side of the split core 4Z in a state where the extending bottom portion 436Z of the radially inward terminal-accommodating box 431Z is kept non-contact with the high-voltage-side end portion 422. Consequently, the resin box 43Z may not be easily attached to the insulator 41Z.

A need thus exists for a stator of a rotary electrical machine, which is not susceptible to the drawbacks mentioned above.

SUMMARY

According to an aspect of this disclosure, a stator of a rotary electrical machine, includes a core unit configured by a plurality of core assemblies arranged in an annular shape, each of the core assemblies including a laminated steel plate, an insulator insulating a portion of the laminated steel plate, and a coil wound around the insulator, a bus ring formed in an annular shape to face the core unit, the bus ring supplying an electric power to the coil, and an accommodating box arranged at the insulator, accommodating an end portion of the coil, and including a radially inward engaged portion and a radially outward engaged portion, the stator generating a rotating magnetic field when the electric power is applied to the coil, the insulator including radially inward and outward extending portions positioned at radially inward and outward sides of the core unit relative to the coil in an extending manner to support the accommodating box, the radially inward extending portion including a radially inward engagement portion which serves as a rotation center about which the accommodating box rotates in a radial direction of the core unit from an initial attachment position to an attached position, and which engages with the radially inward engaged portion so that the accommodating box is movable relative to the insulator in the radial direction of the core unit in a state where the accommodating box is in the attached position, the radially outward extending portion including a radially outward engagement portion which engages with the radially outward engaged portion in accordance with the rotation of the accommodating box to move the accommodating box in the radial direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
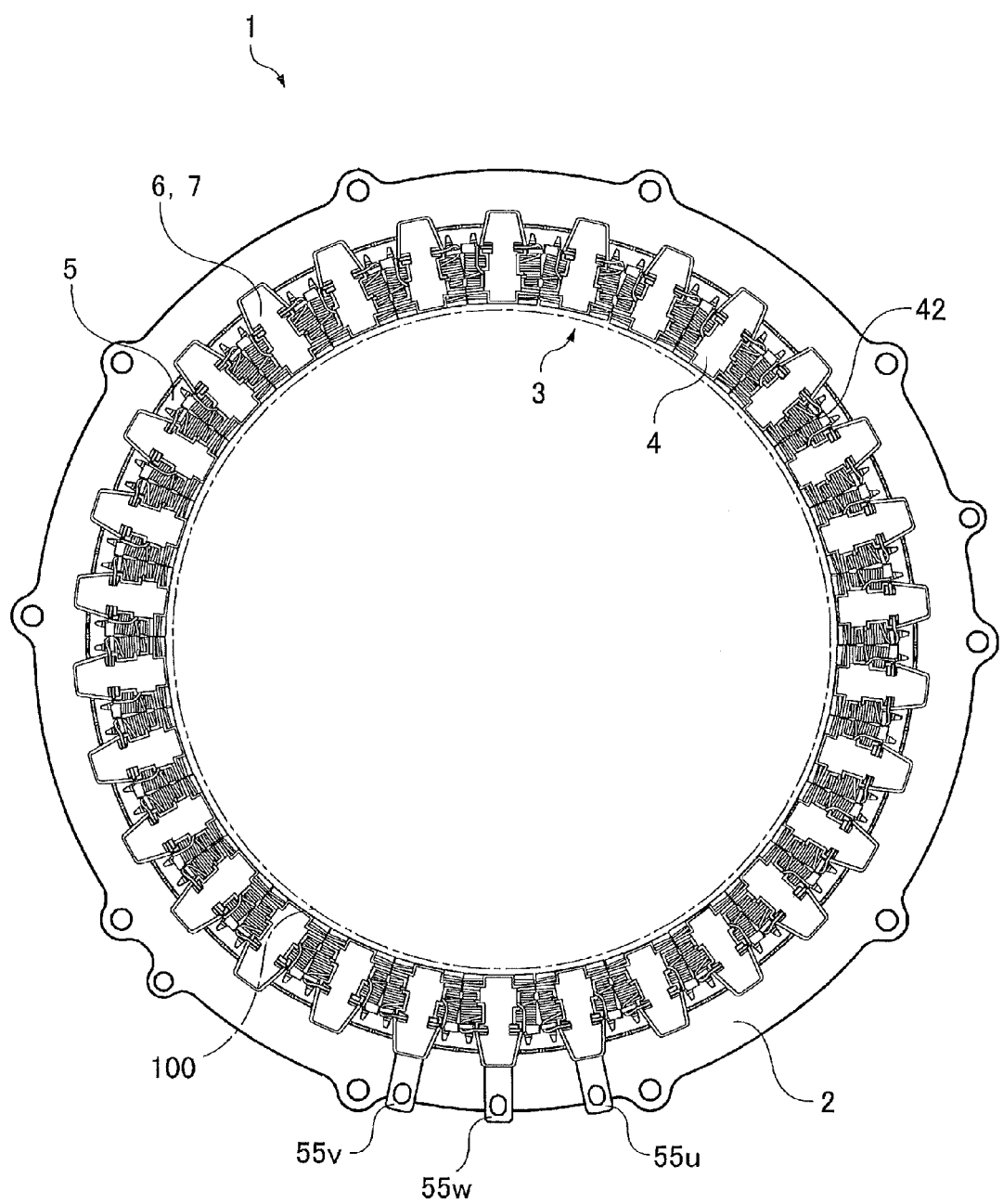
FIG. 1 is a plan view of a stator of a rotary electrical machine according to a first embodiment disclosed here.

[First embodiment] A first embodiment of a stator of a rotary electrical machine (which will be hereinafter referred to as a stator 1) will be described as follows with reference to FIGS. 1 to 8C. In the description, a vertical direction (upper and lower sides) of a split core 4 corresponds to a vertical direction (upper and lower sides) in FIG. 2. However, such direction does not necessarily correspond to an actual orientation of the stator 1. A vertical direction (upper and lower sides) of a bus ring 5 corresponds to a vertical direction (upper and lower sides) in FIG. 7. However, such direction does not necessarily correspond to the actual orientation of the stator 1. The vertical direction of the bus ring 5 illustrated in FIG. 7 is identical to a direction of a central axis of a core unit 3 which will be described below. In addition, in the description, a circumferential direction and inner and outer circumferential sides (or radially outward and radially inward sides) correspond to a circumferential direction and inner and outer circumferential sides (or radially outward and radially inward sides) that are based on a central axis (the central axis of the core unit 3) around which the plural split cores 4 (one of which is illustrated in FIG. 2) are arranged in an annular shape.

As illustrated in FIG. 1, the plural split cores (thirty split cores 4 in the first embodiment) corresponding to core assemblies are arranged at equal intervals on an inner circumferential surface of a stator housing 2 and are supported by the inner circumferential surface. The split cores 4, around each of which a coil 42 is wound, are arranged in series with one another within the stator housing 2 so as to form the substantially annular shape, thereby configuring the core unit 3. The core unit 3 and the bus ring 5 configure plural terminal accommodating boxes 6. Each of the terminal accommodating boxes 6 is filled with an insulating resin material 7. Each of FIGS. 2 to 11 illustrates a status before the terminal accommodating box 6 is filled with the insulating resin material 7.

In addition, a rotor 100, which faces the inner circumferential side of the core unit 3, is shown in FIG. 1 by a dashed line. The rotor 100 is not a component of the stator 1. An electric power supplied from external terminals 55*u*, 55*v*, 55*w* is applied to the split cores 4 to generate a rotating magnetic field at the core unit 3, thereby rotating the rotor 100 relative to the stator 1.

Figure 2:
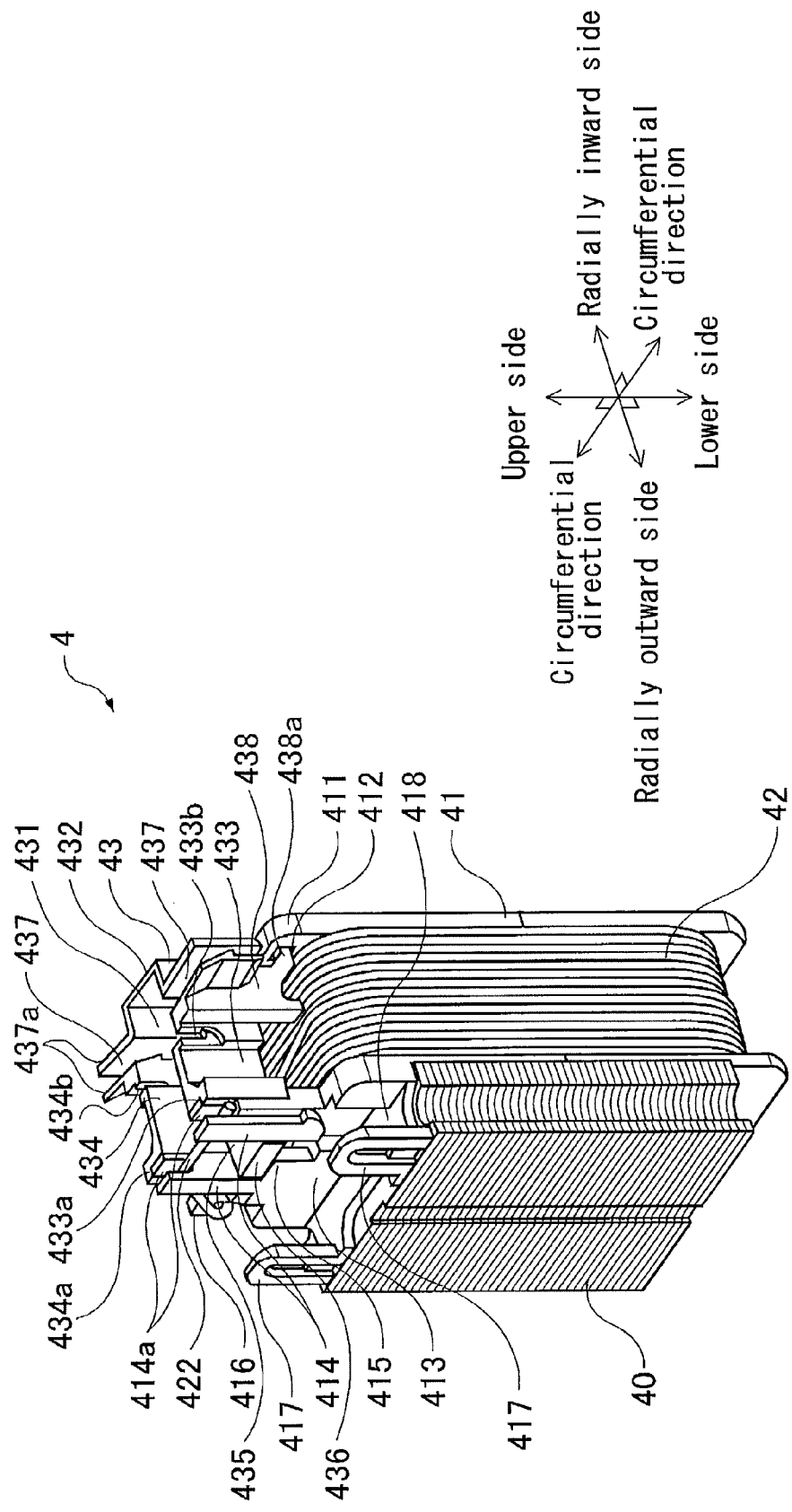
FIG. 2 is a perspective view of a split core of the stator of the rotary electrical machine according to the first embodiment disclosed here.

As illustrated in FIG. 2, the split core 4 includes an insulator 41 having a laminated steel plate 40 therewithin. The insulator 41 made of a synthetic resin material insulates the laminated steel plate 40 provided within the insulator 41. A radially inward flange (radially inward extending portion) 411 extending in the vertical direction of the split core 4 and in the circumferential direction of the core unit 3, is formed at a portion of the insulator 41, which is located at a radially inward end of each of the split cores 4 in a state where the split cores 4 are held by the stator housing 2. A pair of engagement holes (engagement receiving portions, radially inward engagement portions) 412 is formed at an upper portion of the radially inward flange 411. The engagement holes 412 penetrate through the radially inward flange 411. The engagement holes 412 are formed so as to separate from each other by a predetermined distance in a circumferential direction of the stator housing 2 in a state where the split cores 4 are held by the stator housing 2.

A radially outward flange (radially outward extending portion) 413 extending in the vertical direction of the split core 4 and in the circumferential direction of the core unit 3 so as to face radially outwardly relative the radially inward flange 411, is formed at a portion of the insulator 41, which is located at a radially outward end of each of the split cores 4 in a state where the split cores 4 are held by the stator housing 2. A pair of wire engagement portions 414 is formed at an upper end portion of the radially outward flange 413 so as to extend upwardly. The pair of wire engagement portions 414 extending upwardly is positioned so as to separate from each other by a predetermined distance in the circumferential direction. A holding slit 414*a* extending in the circumferential direction is formed in an upper end portion of each of the wire engagement portions 414. Further, a hook portion 416 is formed at an upper end of the radially outward flange 413 so as to be positioned adjacent to a side of one of the wire engagement portions 414 in the circumferential direction. The hook portion 416 is formed into a substantially vertically-reversed L-shape opened outward from the wire engagement portion 414, which is adjacent to the hook portion 416, in a circumferential direction of the split core 4.

Figure 3:
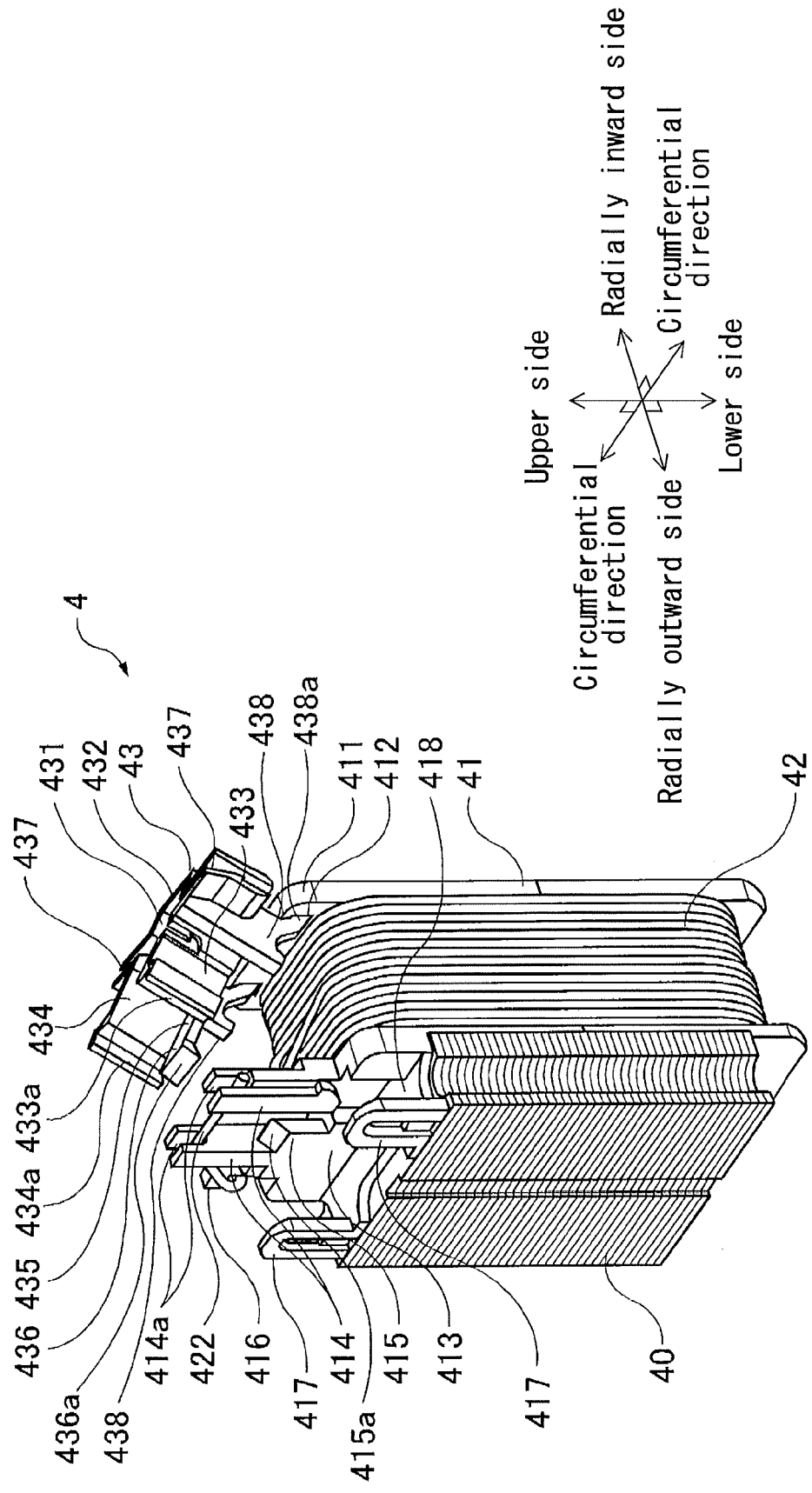
FIG. 3 is a perspective view illustrating a state of attaching a resin box to the split core illustrated in FIG. 2.

As illustrated in FIG. 3, a support portion (radially outward engagement portion) 415 supporting a radially outward side of a resin box 43 which will be described below, from the lower side of the split core 4 is arranged between the wire engagement portions 414 formed at the upper end portion of the radially outward flange 413. An inclined surface 415*a* inclined obliquely upwardly from a radially outward side to a radially inward side of the split core 4 (of the core unit 3) is formed at an upper end of the support portion 415 so as to face upward (see FIG. 8A), i.e., the inclined surface 415*a* is formed so as to be inclined toward the radially inward side as being away from the coil 42.

A pair of retainers 417 protruding upwardly is formed at a portion of the insulator 41, which is located at the radially outward end of each of the split cores 4 in a state where the split cores 4 are held by the stator housing 2. The retainers 417 are positioned at the insulator 41 so as to separate from each other by a predetermined distance in the circumferential direction. The retainers 417 face the resin box 43 which will be described below, in a radial direction of the stator 1. A bus ring insertion portion 418 is formed between the retainers 417 and the radially outward flange 413 in the radial direction of the stator 1.

The coil 42 formed, for example, by an enamel wire, is wound around a portion between the radially inward flange 411 and the radially outward flange 413 of the insulator 41. A high-voltage-side end portion 422 of the coil 42 wound on the insulator 41 is engaged with the hook portion 416. Afterward, the high-voltage-side end portion 422 is bent reversely to be inserted in the holding slits 414*a* of the wire engagement portions 414, therefore extending between the wire engagement portions 414 (see FIG. 2).

Figure 5:
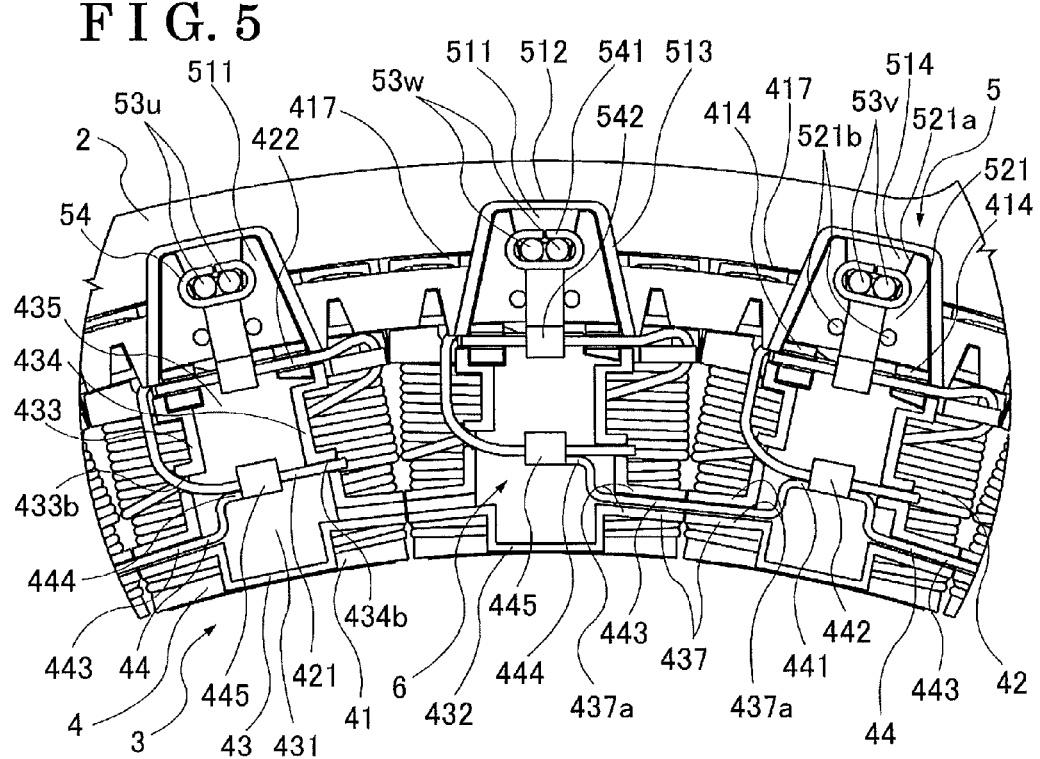
FIG. 5 is a partial plan view of the stator illustrated in FIG. 1.

According to the first embodiment, the resin box 43, made of, for example, aromatic nylon, polyphenylene sulfide resin, or the like, is formed to be a single-piece member having a substantially container shape. As illustrated in FIG. 2, the resin box 43 includes a radially inward terminal-accommodating box (accommodating box) 431 opened to the upper side of the split core 4 (to an opposite direction from the coil 42 in the vertical direction in FIG. 2) and to the radially outward side (to a radially outward terminal-accommodating box 511 which will be described below). The radially inward terminal-accommodating box 431 forms a radially inward accommodating space located at an inward side of the terminal accommodating box 6 in a radial direction of the core unit 3. As illustrated in FIG. 5, the radially inward terminal-accommodating box 431 has a substantially U-shape in a planar view. The accommodating space formed within the radially inward terminal-accommodating box 431 forms a substantially cuboid which has a long side along the radial direction of the stator 1 and surrounded by a bottom portion 435, a radially inward wall 432 formed to stand upwardly from a radially inward end portion of the bottom portion 435, a pair of side walls 433, 434 formed to stand upwardly from circumferential end portions of the bottom portion 435 (see FIGS. 2 and 3). The resin box 43 is configured to be attachable to and detachable from an upper portion of the insulator 41.

Stepped portions 433*a*, 434*a* are formed at radially outward end portions of the side walls 433, 434 so as to increase a distance between the side walls 433, 434 in the circumferential direction. Further, wire holding grooves 433b, 434b opened upward are formed at intermediate portions of the side walls 433, 434, respectively in the radial direction of the core unit 3. Furthermore, terminal attachment portions 437 are formed at circumferential end portions of the side walls 433, 434 so as to extend outwardly therefrom in the circumferential direction. Each of the terminal attachment portions 437 is formed by a pair of holding walls 437a extending vertically and in parallel to each other. A clearance penetrating through each of the side walls 433, 434 is formed between the holding walls 437a facing each other in such a way that a neutral point terminal 44 (which will be described below) may be inserted in the clearance.

Moreover, a pair of protruding walls 438 (radially inward engaged portions) is formed at a radially inward side of the side walls 433, 434 so as to protrude in parallel to each other and downwardly from lower ends of the bottom portion 435 in the circumferential direction (see FIGS. 3 and 8). A pair of engagement protrusions (engagement protruding portions) 438a is formed at respective lower ends of the protruding walls 438 so as to protrude radially inwardly. Each of the engagement protrusions 438a has the same wall thickness as each of the protruding walls 438. The engagement protrusion 438a is formed in a protruding shape that is separated from the bottom portion 435. In addition, a pair of leg portions 439 protruding downwardly from the lower ends of the bottom portion 435 in the circumferential direction is formed at the respective circumferential end portions of the side walls 433, 434 (see FIG. 8).

As illustrated in FIG. 2, the bottom portion 435 includes an extending bottom portion (radially outward engaged portion) 436 that is formed so as to extend radially outwardly to a boundary line between the split core 4 and the bus ring 5 (so as to extend radially outwardly to a position adjacent to a radially outward end portion of each of the wire engagement portions 414) in a state where the resin box 43 is attached to the upper portion of the insulator 41. A width of the extending bottom portion 436 in the circumferential direction is slightly smaller than a distance of a clearance between the pair of wire engagement portions 414 of the insulator 41 in the circumferential direction; thereby, the extending bottom portion 436 is configured to be insertable between the pair of wire engagement portions 414. A protruding portion 436a is formed at a radially outward end portion of the extending bottom portion 436 so as to protrude downwardly therefrom. An inclined surface 436b inclined obliquely upwardly from the radially outward side to the radially inward side of the split core 4 is formed at a lower end of the protruding portion 436a so as to face downward (see FIGS. 8A, 8B, and 8C).

Figure 8A:
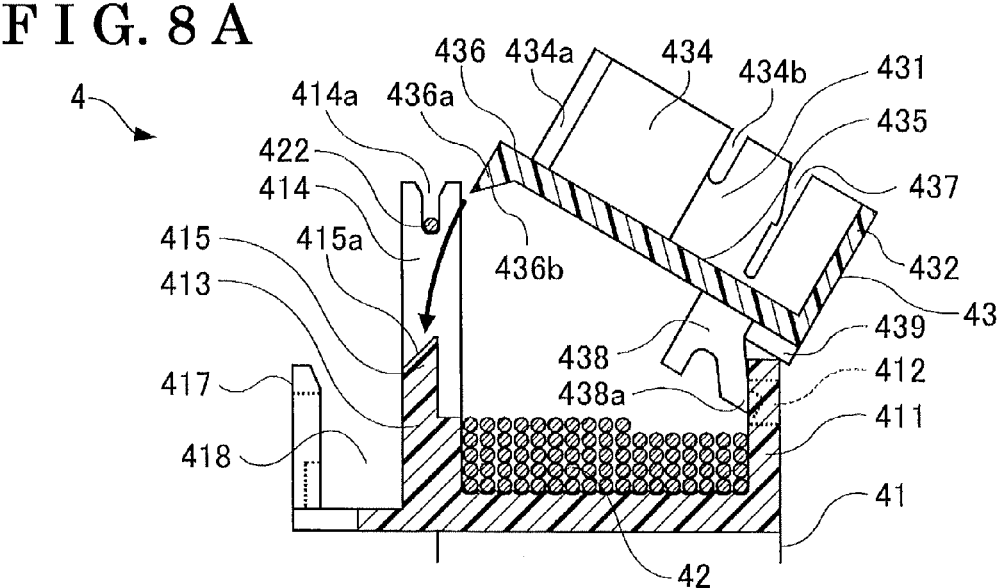
FIG. 8A is a cross sectional view illustrating a state of attaching the resin box to the split core of the stator of the rotary electrical machine according to the first embodiment disclosed here and showing a state where the resin box rotates downward from an initial attachment position to an attached position relative to the split core.
Figure 8B:
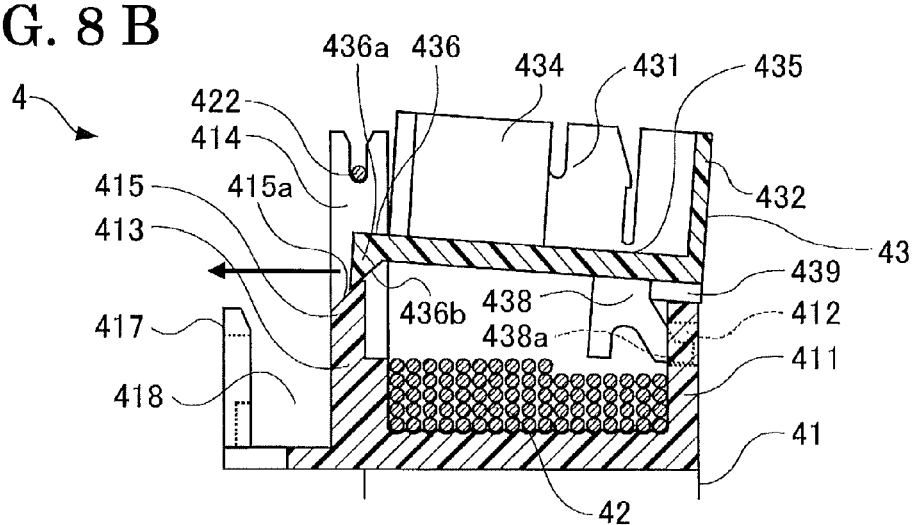
FIG. 8B is a cross sectional view illustrating a state where the resin box is being guided radially outwardly.
Figure 8C:
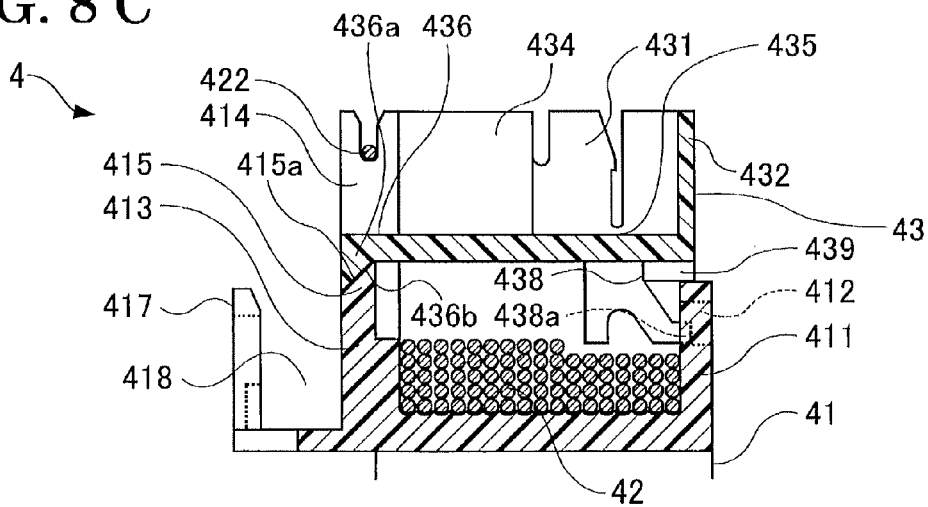
FIG. 8C is a cross sectional view illustrating a state where the resin box is completely attached to the split core.

As illustrated in FIG. 2, the resin box 43 is attached to the upper portion of the insulator 41 on which the coil 42 is wound, therefore configuring the split core 4. With reference to FIGS. 8A, 8B, and 8C, an attaching method to attach the resin box 43 to the insulator 41 of the split core 4 (to attach the radially inward terminal-accommodating box 431 to the insulator 41) will be described as follows. FIG. 8A illustrates a state where the resin box 43 starts rotating downwardly from an initial attachment position. The pair of engagement protrusions 438a of the resin box 43 is deeply inserted in a movable manner into the pair of engagement holes 412 formed in the radially inward flange 411 of the insulator 41, from the radially inward side to the radially outward side in a state where the resin box 43 is kept inclined as illustrated in FIG. 8A.

In a state where the pair of engagement protrusions 438a of the resin box 43 is deeply inserted in the pair of engagement holes 412, a radially inward end portion of each of the pair of protruding walls 438 formed at the resin box 43 is brought into contact with a radially outward edge of each of the pair of engagement holes 412; thereby, the resin box 43 is restricted from moving radially inwardly relative to the radially inward flange 411 and is allowed to move radially outwardly from the radially inward flange 411. In addition, a lower end of each of the pair of leg portions 439 formed at the resin box 43 is supported by an upper end of the radially inward flange 411 from a lower side of the leg portion 439. As indicated by an arrow in FIG. 8A, the resin box 43 may be rotated around a portion in the vicinity of the engagement hole 412 from the initial attachment position at the upper side in FIG. 8A to an attached position located at a lower side of the initial attachment position in FIG. 8A in a condition where a radially inward position of the resin box 43 is determined as described above. As illustrated in FIG. 8A, in the midst of the rotation of the resin box 43 from the initial attachment position to the attachment position, the extending bottom portion 436 does not make contact with the high-voltage-side end portion 422 that is arranged so as to extend between the wire engagement portions 414.

FIG. 8B illustrates a state where the resin box 43 is being guided to move radially outwardly. When the resin box 43 moves downwardly, the inclined surface 415a formed at the support portion 415 of the radially outward flange 413 starts making contact with the inclined surface 436b formed at the protruding portion 436a of the extending bottom portion 436 of the resin box 43, as illustrated in FIG. 8B. In accordance with the downward rotation of the resin box 43, the inclined surface 415a and the inclined surface 436b slidably contact each other and are thereafter engaged with each other. As a result, the resin box 43 is guided to move radially outwardly as indicated by an arrow in FIG. 8B.

FIG. 8C illustrates a state where the resin box 43 is completely attached to the insulator 41 of the split core 4. At the radially outward side of the resin box 43, the inclined surface 415a and the inclined surface 436b are entirely engaged with each other when the resin box 43 is arranged in the attached position as shown in FIGS. 2 and 8C. In addition, at the radially outward side of the resin box 43, the extending bottom portion 436 is supported from a lower side thereof by the support portion 415 and the radially outward end portion of the extending bottom portion 436 is positioned in the vicinity of the boundary line between the split core 4 and the bus ring 5. Furthermore, the stepped portions 433a, 434a of the side walls 433, 434 are engaged with the wire engagement portions 414 from an outer side thereof in the circumferential direction (see FIG. 2). Meanwhile, at the radially inward side of the resin box 43, the pair of leg portions 439 is supported from a lower side thereof by the upper end of the radially inward flange 411 when the resin box 43 is arranged in the attached position as illustrated in FIG. 8C. In addition, at the radially inward side of the resin box 43, the pair of engagement protrusions 438a is inserted in a movable manner into the pair of engagement holes 412 so as to be shallowly engaged therewith.

Figure 4:
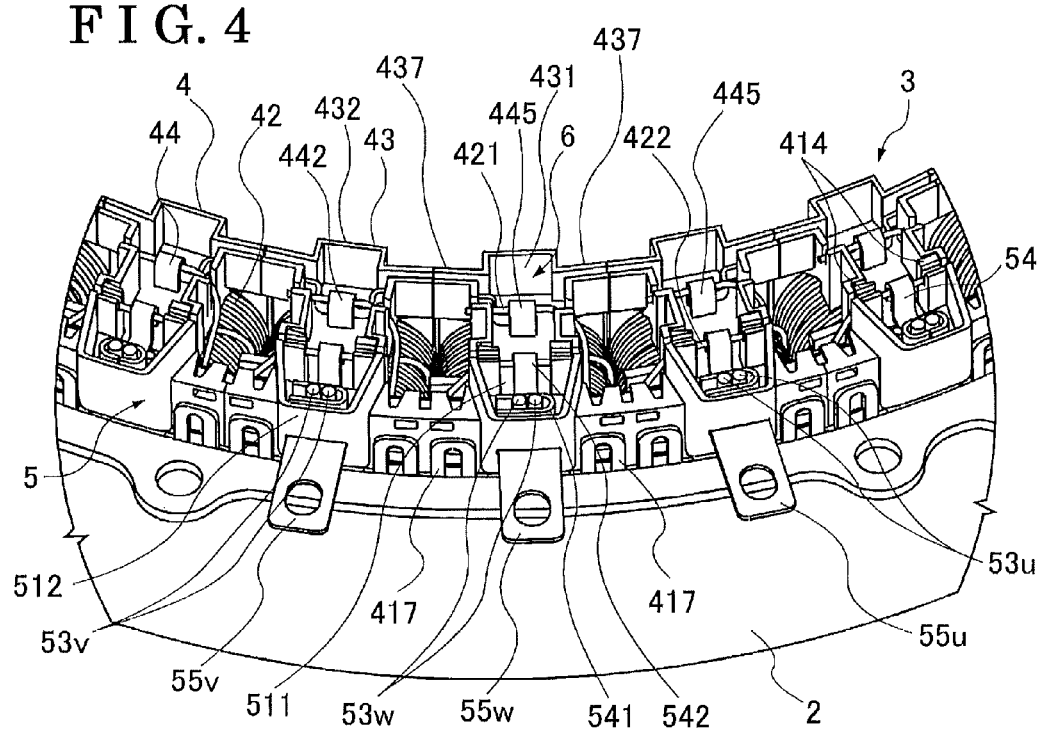
FIG. 4 is a partial perspective view of the stator illustrated in FIG. 1 as seen from upper and outer circumferential sides of the stator.

After the resin box 43 is attached to the insulator 41, a low-voltage-side end portion (end portion) 421 of the coil 42 is inserted in the wire holding groove 433b of the side wall 433 to be thereafter engaged with the wire holding groove 434b of the side wall 434 as illustrated in FIG. 5. Therefore, the low-voltage-side end portion 421 is positioned so as to extend between the side walls 433, 434. Afterward, as illustrated in FIG. 1, all of the split cores 4 are attached to the inner circumferential surface of the stator housing 2 so as to be arranged in the annular shape. FIG. 4 is a partial perspective view illustrating a peripheral area of the external terminals 55u, 55v, 55w of the stator 1 shown in FIG. 1, as seen from upper and outer circumferential sides of the stator 1. FIG. 5 is a partial plan view of a portion positioned radially opposite from the portion illustrated in FIG. 4, as seen from the upper side from the stator 1.

As illustrated in FIGS. 4 and 5, the neutral point terminals 44 each serving as a low-voltage-side terminal are respectively attached to the resin boxes 43 of the core unit 3 configured by the split cores 4 arranged in the annular shape. Each of the neutral point terminals 44 is made of metal having electric conductivity. The neutral point terminal 44 includes an intermediate protruding portion 441, an intermediate connecting piece 442 formed at an intermediate position of the intermediate protruding portion 441 in the circumferential direction, insertion portions 443 each having a linear shape, end portions 444, and a pair of end portion connecting pieces 445. The intermediate connecting piece 442 is provided at an intermediate position of the neutral point terminal 44 in a longitudinal direction thereof. When seen in a planar view, the neutral point terminal 44 is symmetrically shaped about the intermediate protruding portion 441. The intermediate protruding portion 441 protrudes radially outwardly in a state where the neutral point terminal 44 is attached to the resin box 43. The insertion portions 443 are connected to both ends of the intermediate protruding portion 441. The end portions 444 protruding radially outwardly are formed at the insertion portions 443, respectively. The end portion connecting pieces 445 are formed at respective ends of the end portions 444.

The insertion portions 443 of the neutral point terminal 44 are inserted between the holding walls 437a of the resin boxes 43 arranged adjacent to one another, thereby being attached to the three adjacent resin boxes 43. Consequently, the intermediate connecting piece 442 and the pair of end portion connecting pieces 445 are arranged within the respective resin boxes 43 of the three split cores 4 arranged adjacent to one another. The intermediate connecting piece 442 and the end portion connecting pieces 445 are fixed to the corresponding low-voltage-side end portions 421 of the coils 42, each of which is arranged so as to extend between the side walls 433, 434, by means of fusing, swaging, welding, and the like. As a result, the low-voltage-side end portions 421 of the coils 42 are connected to one another. All of the neutral point terminals 44 are connected to a low-voltage side of an inverter.

Figure 6:
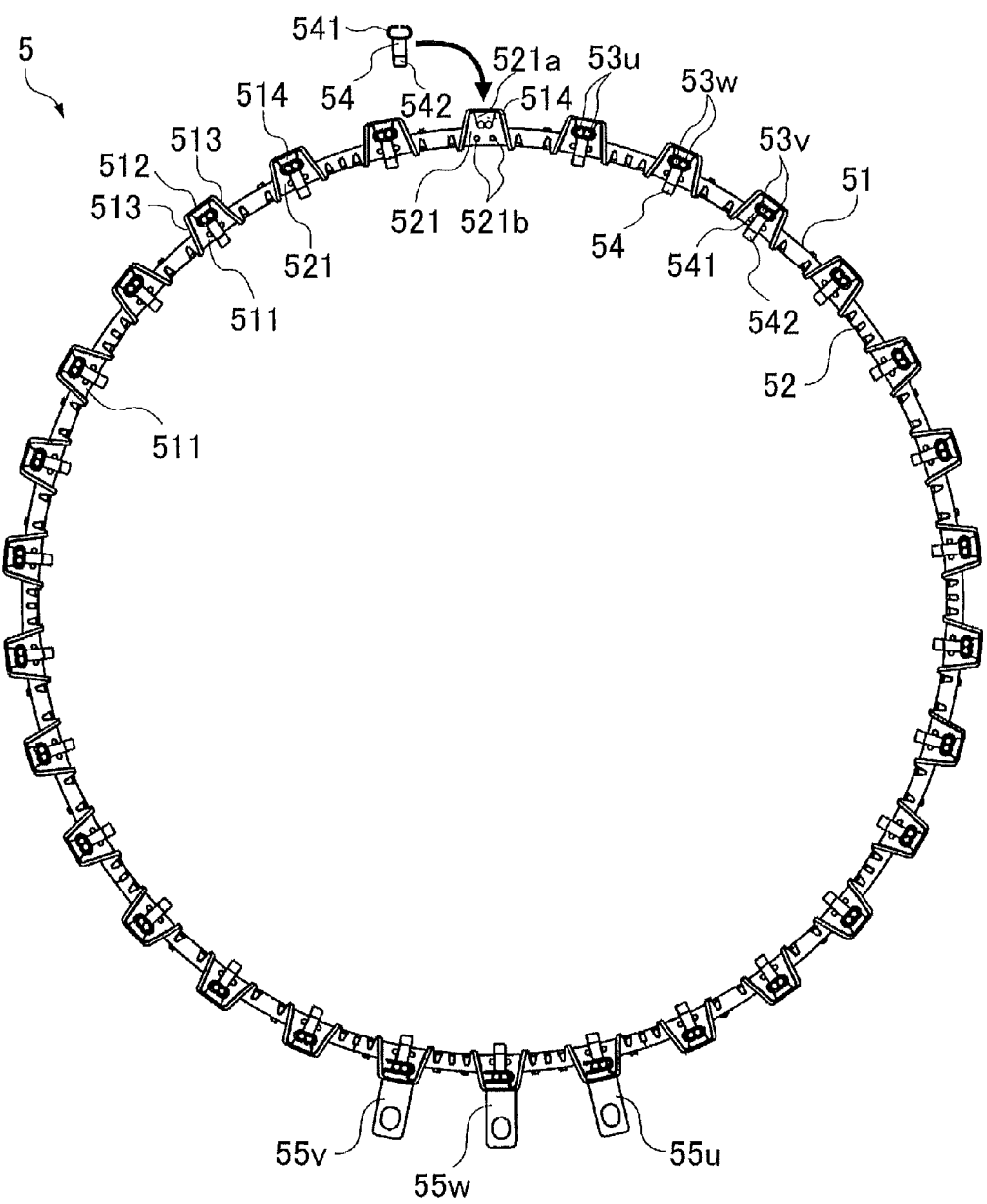
FIG. 6 is a plan view of a bus ring of the stator of the rotary electrical machine according to the first embodiment disclosed here.
Figure 7:
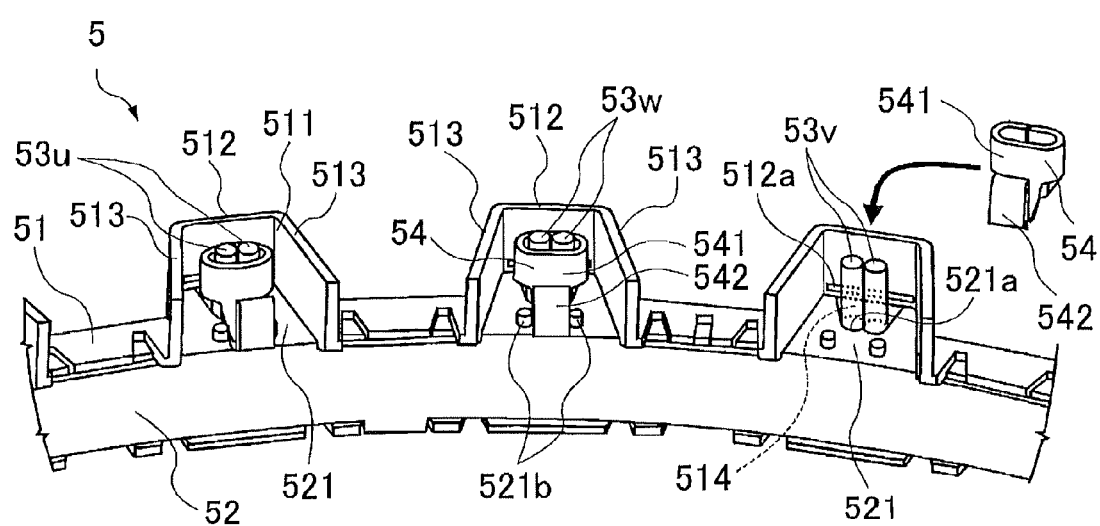
FIG. 7 is a partial perspective view of the bus ring illustrated in FIG. 6 as seen from the upper side and an inner circumferential side of the stator.

Each of FIGS. 6 and 7 illustrates the bus ring 5 and shows a state where one of the thirty electricity supply terminals 54 which will be described below is not attached to the bus ring 5. As illustrated in FIG. 6, the bus ring 5 is formed into an annular shape so as to face the radially outward side of the core unit 3. The bus ring 5 includes an outer clip 51 and an inner clip 52 that are made of synthetic resin material. The outer clip 51 and the inner clip 52 each formed into an annular shape are radially engaged with each other. Each of the outer clip 51 and the inner clip 52 may be configured by plural separate segments that are connected to one another.

As illustrated in FIGS. 1, 4, and 6, the external terminals 55u, 55v, 55w to be connected to corresponding phases of a high-voltage side of the inverter extend from three portions of the outer clip 51. The external terminals 55u, 55v, 55w are connected to the electricity supply terminals 54 (each serving as a high-voltage-side terminal) of corresponding phases. Alternatively, the external terminals 55u, 55v, 55w and the corresponding electricity supply terminals 54 may be integrally formed with one another.

The bus ring 5 further includes the plural wire segments 53u (each serving as an electricity supply wire), the plural wire segments 53v (each serving as an electricity supply wire), and the plural wire segments 53w (each serving as an electricity supply wire) for corresponding phases. Each of the wire segments 53u, 53v, 53w, for example, made of an enamel wire is formed into a substantially circular arc. The bus ring 5 made of metal having electric conductivity further includes the electricity supply terminals 54 swaged respectively to the wire segments 53u in a pair, the wire segments 53v in a pair, the wire segments 53w in a pair (see FIG. 7).

A pair of annular ribs positioned in a vertical direction of the bus ring 5 is formed at an inner circumferential surface of the outer clip 51 so as to protrude radially inwardly. A pair of annular ribs positioned in the vertical direction of the bus ring 5 is formed at an outer circumferential surface of the inner clip 52 so as to protrude radially outwardly. When the outer clip 51 and the inner clip 52 are fitted to and engaged with each other, an inside of the bus ring 5 is divided by the annular ribs of the outer clip 51 and the annular ribs of the inner clip 52 into three portions in the vertical direction. Different phases are retained in respective spaces of the three divided portions of the inside of the bus ring 5 so as not to contact one another.

End portions of the pair of wire segments 53u having the same phase, end portions of the pair of wire segments 53v having the same phase, and end portions of the pair of wire segments 53w having the same phase extend upwardly and the end portions in each pair of wire segments 53u, 53v, 53w are swaged by the electricity supply terminal 54 so as to be connected to each other. The electricity supply terminal 54 includes a swaging portion 541 swaged to the end portions in each pair of the wire segments 53u, 53v, 53w, and a coil engagement portion 542 which extends to a radially inward side of the bus ring 5. An end of the coil engagement portion 542 is configured to extend upward and subsequently extend downward, thereby being formed in a substantially reversed U-shape (see FIG. 7).

As illustrated in FIGS. 5 and 7, the plural radially outward terminal-accommodating boxes 511 (the thirty radially outward terminal-accommodating boxes 511) are arranged at equal intervals on an upper surface of the outer clip 51 in a circumferential direction thereof. Each of the radially outward terminal-accommodating boxes 511 is formed so as to have a substantially container shape opened upward (to the opposite direction from the coil 42) and radially inward (to the radially inward terminal-accommodating box 431). The radially outward terminal-accommodating box 511 forms a radially outward accommodating space located at an outward side of the terminal accommodating box 6 in the radial direction of the core unit 3. The radially outward terminal-accommodating box 511 is formed by a radially outward wall 512 positioned at a radially outward side of the bus ring 5, a pair of side walls 513 extending radially inwardly from circumferential ends of the radially outward wall 512, a holding piece 514 for holding the outer clip 51, and a holding flange 521 for holding the inner clip 52. The holding piece 514 and the holding flange 521 correspond to a bottom portion of the radially outward terminal-accommodating box 511. Respective end portions of the side walls 513 are opened; thereby, the radially outward terminal-accommodating box 511 has a trapezoidal shape in a planar view.

A terminal hole 512a through which each of the external terminals 55u, 55v, 55w is pulled radially outwardly is formed at a lower side of the radially outward wall 512 (see FIG. 7). In particular, the terminal hole 512a is formed in an inner circumferential surface of the radially outward wall 512. Further, as illustrated in FIGS. 5 and 7, the holding piece 514 protruding radially inwardly is formed at the inner circumferential surface of the radially outward wall 512 so as to be positioned at a lower side of the terminal hole 512a. The holding piece 514 has a trapezoidal shape in a planar view and each of the wire segments 53u, 53w, 53v is held by a radially inward end portion of the holding piece 514.

As illustrated in FIGS. 5 and 7, the plural holding flanges 521 protruding radially outwardly are arranged at equal intervals on an upper end of the inner clip 52 in a circumferential direction thereof. Each of the holding flanges 521 having a trapezoidal shape in a planar view is fitted to the inner circumferential surface of the radially outward terminal-accommodating box 511. A cutout portion 521a having a trapezoidal shape is formed at a radially outward side of the holding flange 521. The holding piece 514 is fitted to the cutout portion 521a of the holding flange 521. The end portions of the pair of wire segments 53u, the end portions of the pair of wire segments 53w, and the end portions of the pair of wire segments 53v are held by corresponding radially inward end portions of the cutout portions 521a. In addition, a pair of holding protrusions 521b is formed on the holding flange 521. The coil engagement portion 542 of the electricity supply terminal 54 is held by the holding protrusions 521b so as to be fitted therebetween.

The outer clip 51 and the inner clip 52 are fitted to and engaged with each other, thereby forming the plural radially outward terminal-accommodating boxes 511. In addition, as illustrated in FIG. 7, the electricity supply terminals 54 each swaged to the pair of wire segments 53u, the pair of wire segments 53v, and the pair of wire segments 53w are surrounded by the radially outward terminal-accommodating boxes 511, respectively. The end portions of the pair of wire segments 53u having the same phase, the end portions of the pair of wire segments 53v having the same phase, and the end portions of the pair of wire segments 53w having the same phase are located at every third position on the upper surface of the outer clip 51 in the circumferential direction thereof so as to protrude upward within the corresponding radially outward terminal-accommodating boxes 511. In addition, the holding piece 514 of each of the radially outward terminal-accommodating boxes 511 is fitted to and engaged with the cutout portion 521a of the inner clip 52; thereby, a clearance is generated between the radially inward end portion of the holding piece 514 and the radially inward end portion of the cutout portion 521a. The end portions of the pair of wire segments 53u, the end portions of the pair of wire segments 53v, and the end portions of the pair of wire segments 53w are inserted in the corresponding clearances between the radially inward end portions of the holding pieces 514 and the radially inward end portions of the cutout portions 521a and are held by the corresponding clearances.

In order to attach the bus ring 5 to the core unit 3 held by the stator 1, the bus ring 5 is provided so as to face the core unit 3 from an upper side thereof as illustrated in FIG. 4. Then, the bus ring 5 is inserted in the bus ring insertion portions 418 of the split cores 4, respectively. Therefore, a position of the radially outward wall 512 of each of the radially outward terminal-accommodating boxes 511 of the bus ring 5 is determined in such a way that the radially outward wall 512 is arranged between the pair of retainers 417 of the insulator 41 in the circumferential direction. At this time, radially inward end portions of the side walls 513 of the radially outward terminal-accommodating box 511 face the radially outward end portions of the side walls 433, 434 of the resin box 43 from the radially outward side of the bus ring 5 while the wire engagement portions 414 of the split core 4 are positioned between the radially inward end portions of the side walls 513 in the circumferential direction.

Thus, the radially outward terminal-accommodating boxes 511 and the radially inward terminal-accommodating boxes 431 are aligned along the circumferential direction of the bus ring 5 so as to face radially each other in a state where the wire engagement portions 414 are provided between the radially outward terminal-accommodating boxes 511 and the radially inward terminal-accommodating boxes 431. As a result, the terminal accommodating boxes 6 each having the container shape which is opened upward and which includes a predetermined volume, are separately formed at the split cores 4. In the terminal accommodating box 6, the coil engagement portion 542 of the electricity supply terminal 54 is engaged with the high-voltage-side end portion 422 of the coil 42 that is arranged so as to extend between the wire engagement portions 414. Thereafter, the coil engagement portion 542 is fixed to the high-voltage-side end portion 422 by means of fusing, swaging, welding, and the like.

The insulating resin material 7 serving as a potting material is filled in each of the terminal accommodating boxes 6 in a state where a connected portion between the neutral point terminal 44 and the low-voltage-side end portion 421 of the coil 42 and a connected portion between the electricity supply terminal 54 and the high-voltage-side end portion 422 of the coil 42 are accommodated in the terminal accommodating box 6 (see FIG. 1). The insulating resin material 7 includes predetermined viscosity. Therefore, for example, even in a case where small clearances are generated between the radially inward terminal-accommodating box 431 and the wire engagement portions 414 and between the radially outward terminal portion 511 and the wire engagement portions 414 at the timing of filling the insulating resin material 7 in the terminal accommodating boxes 6, the insulating resin material 7 does not flow out of the terminal accommodating boxes 6. The insulating resin material 7 filled in the terminal accommodating boxes 6 is solidified; thereby, the insulators 41, the resin boxes 43, and the bus ring 5 are fixed to one another to therefore complete the stator 1.

In the stator 1, an electric power is applied from the external terminals 55u, 55v, 55w via the wire segments 53u, 53u, 53v to the coils 42 of each phase, thereby generating a rotating magnetic field.

According to the first embodiment, in order to attach the resin box 43 including the radially inward terminal-accommodating box 431 to the upper portion of the insulator 41, firstly, the pair of engagement protrusions 438a integrally formed with the radially inward terminal-accommodating box 431 is inserted in a movable manner into the pair of engagement holes 412 formed in the radially inward flange 411 of the insulator 41; thereby, the radially inward position of the radially inward terminal-accommodating box 431 is determined. Then, the radially inward terminal-accommodating box 431 is rotated from the initial attachment position to the attached position. Therefore, the inclined surface 436b formed at the protruding portion 436a of the extending bottom portion 436 of the radially inward terminal-accommodating box 431 slidably contacts the inclined surface 415a formed at the support portion 415 of the radially outward flange 413 in accordance with the rotation of the radially inward terminal-accommodating box 431 and is thereafter engaged with the inclined surface 415a. As a result, the resin box 43 including the radially inward terminal-accommodating box 431 is guided to move radially outwardly and thus the radially inward terminal-accommodating box 431 may be arranged adjacent to the radially outward terminal-accommodating box 511 in a state where the radially inward terminal-accommodating box 431 is in the attached position (i.e., in a state where the radially inward terminal-accommodating box 431 is attached to the insulator 41).

Accordingly, for example, a clearance from which the insulating resin material 7 may flow is generated between the radially inward terminal-accommodating box 431 and the radially outward terminal-accommodating box 511 until just before the radially inward terminal-accommodating box 431 is rotated to the attached position. Even in such case, the radially inward terminal-accommodating box 431 is rotated to the attached position to therefore move radially outwardly toward the radially outward terminal-accommodating box 511. As a result, the clearance is reduced. Thus, according to the first embodiment, in the case of attaching the radially inward terminal-accommodating box 431 (i.e., the resin box 43) to the insulator 41, a contact of the radially inward terminal-accommodating box 431 with the radially outward terminal-accommodating box 511 is of no concern and the radially inward terminal-accommodating box 431 (i.e., the resin box 43) may be easily attached to the insulator 41. Further, in a state where the radially inward terminal-accommodating box 431 (i.e., the resin box 43) is attached to the insulator 41, the radially inward terminal-accommodating box 431 and the radially outward terminal-accommodating box 511 are positioned adjacent to one another; therefore, the insulating resin material 7 does not flow out from a bottom portion of the terminal accommodating box 6 and the like.

Further, according to the first embodiment, the inclined surface 415a formed at the radially outward flange 413 and the inclined surface 436b formed at the radially inward terminal-accommodating box 431 are configured to be inclined obliquely upwardly from the radially outward side to the radially inward side. As a result, the radially inward terminal-accommodating box 431 may be moved radially in accordance with the rotation thereof by a simple configuration. Furthermore, according to the first embodiment, two members of the extending bottom portion 436 of the radially inward terminal-accommodating box 431 and the support portion 415 of the radially outward terminal-accommodating box 511 may easily or simply establish the engagement between the inclined surface 415a and the inclined surface 436b and may surely support a radially outward side of the bottom portion 435 of the radially inward terminal-accommodating box 431.

Moreover, according to the first embodiment, the engagement protrusions 438a formed at the radially inward terminal-accommodating box 431 are inserted in a movable manner into the engagement holes 412 formed in the radially inward flange 411 of the insulator 41. As a result, such simple configuration restricts the radially inward terminal-accommodating box 431 from moving radially inwardly relative to the radially inward flange 411 and allows the radially inward terminal-accommodating box 431 to move radially outwardly, thereby supporting the radially inward terminal-accommodating box 431; thereby, the radially inward terminal-accommodating box 431 may be supported so as to move radially. In addition, in a state where the radially inward terminal-accommodating box 431 is attached to the insulator 41, the engagement protrusions 438a are shallowly inserted in a movable manner into the engagement holes 412. Therefore, the radially inward terminal-accommodating box 431 is restricted from loosening from the radially inward flange 411 of the insulator 41. As a result, in the first embodiment, the radially inward terminal-accommodating box 431 may be appropriately attached to the insulator 41 and may be surely held in the attached position.

Additionally, according to the first embodiment, the attaching operation of the radially inward terminal-accommodating box 431 to the insulator 41 is conducted in a state where the high-voltage-side end portion 422 of the coil 42 is arranged to extend between the pair of wire engagement portions 414. However, in the midst of the rotation of the radially inward terminal-accommodating box 431 from the initial attachment position to the attached position, the extending bottom portion 436 of the radially inward terminal-accommodating box 431 does not make contact with the high-voltage-side end portion 422 arranged to extend between the pair of wire engagement portions 414. Therefore, in the first embodiment, a contact of the radially inward terminal-accommodating box 431 with the high-voltage-side end portion 422 is of no concern and the radially inward terminal-accommodating box 431 may be easily attached to the insulator 41.

[Second embodiment] A second embodiment of the disclosure will be described as follows with reference to FIGS. 9A, 9B, and 9C. In the second embodiment, the split core 4 in the stator 1 according to the first embodiment is modified to a split core 4B corresponding to the core assembly. Other components and the like of the second embodiment are substantially the same as those of the first embodiment, and the description thereof is therefore omitted. In addition, components configuring the split core 4B and being the same as those of the split core 4 in the stator 1 of the first embodiment are designated by the same reference numerals and the description thereof is partially omitted.

Figure 9A:
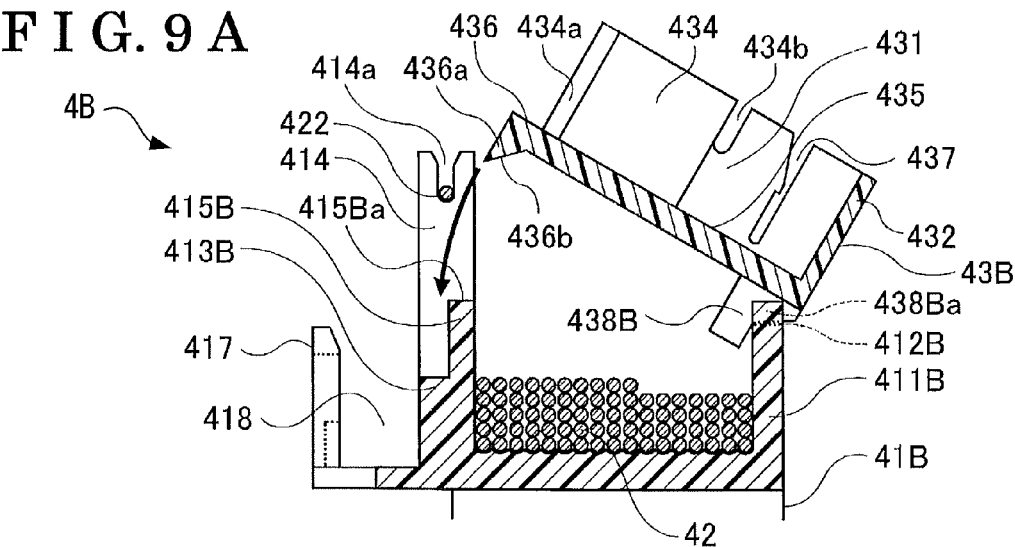
FIG. 9A is a cross sectional view illustrating a state of attaching the resin box to the split core of the stator of the rotary electrical machine according to a second embodiment disclosed here and showing a state where the resin box rotates downward from an initial attachment position to an attached position relative to the split core.

FIG. 9A illustrates a state where a resin box 43B rotates downwardly from an initial attachment position to an attached position. FIG. 9B illustrates a state where the resin box 43B is being guided to move radially outwardly. FIG. 9C illustrates a state where the resin box 43B is completely attached to an insulator 41B.

Figure 9B:
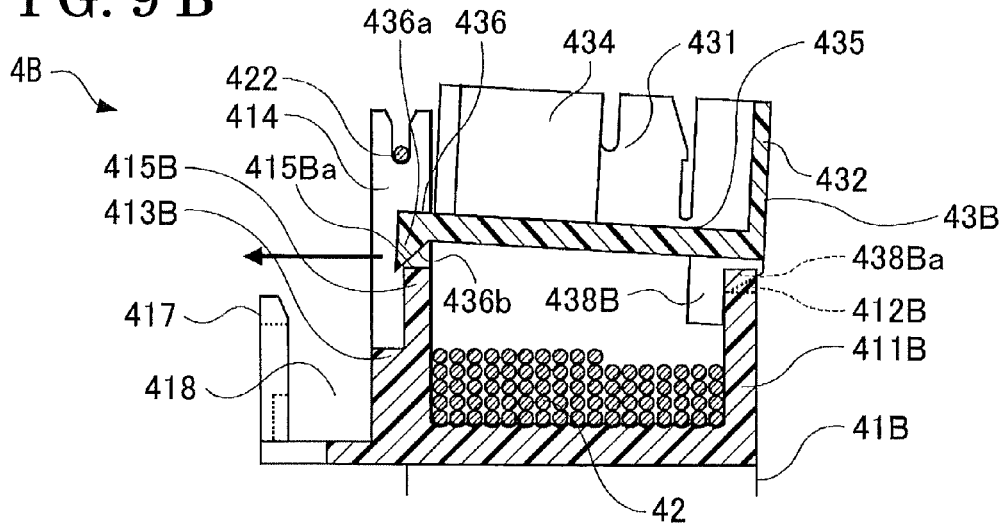
FIG. 9B is a cross sectional view illustrating a state where the resin box is being guided radially outwardly.
Figure 9C:
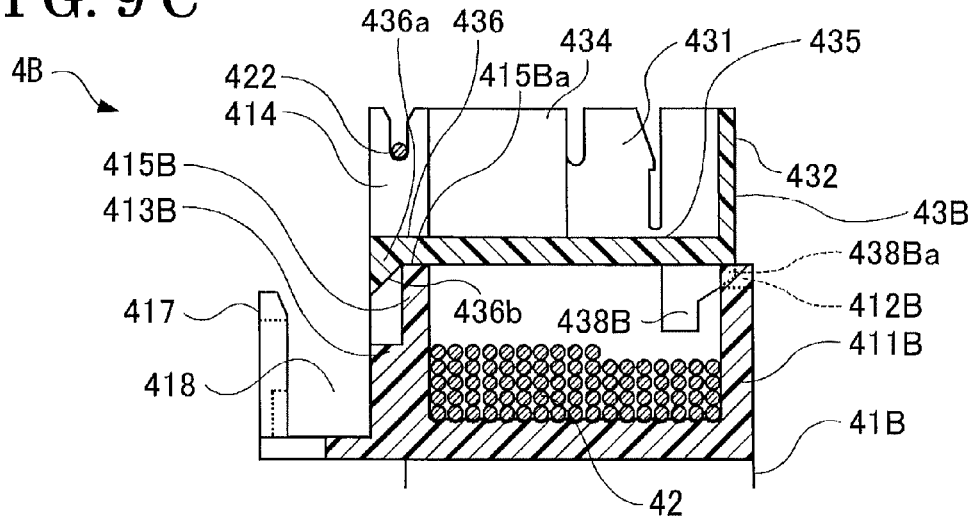
FIG. 9C is a cross sectional view illustrating a state where the resin box is completely attached to the split core.

As illustrated in FIGS. 9A, 9B, and 9C, a radially inward flange (radially inward extending portion) 411B extending in a vertical direction of a split core 4B and in the circumferential direction of the core unit 3, is formed at a portion of the insulator 41B, which is located at a radially inward end of the split core 4B. A pair of engagement grooves (engagement receiving portions, radially inward engagement portions) 412B is formed at an upper portion of the radially inward flange 411B. Each of the engagement grooves 412B is a groove recessed downwardly from an upper end of the radially inward flange 411B and penetrating through the radially inward flange 411B in the radial direction of the core unit 3. The engagement grooves 412B are formed so as to separate from each other by a predetermined distance in the circumferential direction of the stator housing 2 in a state where the split cores 4B are held by the stator housing 2.

A radially outward flange (radially outward extending portion) 413B extending in the vertical direction of the split core 4B and in the circumferential direction of the core unit 3 so as to face radially outwardly relative the radially inward flange 411B, is formed at a portion of the insulator 41B, which is located at a radially outward end of the split core 4B. The pair of wire engagement portions 414 similar to those of the first embodiment is formed at an upper end portion of the radially outward flange 413B. The high-voltage-side end portion 422 of the coil 42 is arranged to extend between the pair of wire engagement portions 414. In addition, a support portion (radially outward engagement portion) 415B supporting a radially outward side of the resin box 43B from a lower side thereof is formed at the radially outward flange 413B so as to be arranged between the pair of wire engagement portions 414. The support portion 415B is positioned further radially inward than the support portion 415 of the first embodiment, which is shown in FIGS. 8A, 8B, and 8C. A flat surface (an engagement surface) 415Ba is formed at an upper end of the support portion 415B so as to face upward.

The resin box 43B includes the radially inward terminal-accommodating box 431 similar to that of the first embodiment. The resin box 43B according to the second embodiment includes a pair of protruding walls (radially inward engaged portions) 438B and a pair of engagement protruding walls (engagement protruding portions) 438Ba instead of the protruding walls 438, the engagement protrusions 438a, and the leg portions 439 that are formed at the resin box 43 in the first embodiment. The pair of protruding walls 438B protrudes in parallel to each other and downwardly form the lower ends of the bottom portion 435 in the circumferential direction. Each of the engagement protruding walls 438Ba is formed within a range from an upper end of each of the protruding walls 438B and to an intermediate portion in a vertical direction of the protruding wall 438B. The engagement protruding wall 438Ba has the same wall thickness as the protruding wall 438B and protrudes radially inwardly. An upper end of the engagement protruding wall 438Ba is integrally formed with the lower end of the bottom portion 435 in the circumferential direction.

An attaching method to attach the resin box 43B to the insulator 41B (to attach the radially inward terminal-accommodating box 431 to the insulator 41B) will be described as follows. As illustrated in FIG. 9A, the pair of engagement protruding walls 438Ba of the resin box 43B is deeply inserted in a movable manner into the pair of engagement grooves 412B formed in the radially inward flange 411B of the insulator 41B, from the radially inward side to the radially outward side and from the upper side to the lower side in FIG. 9A in a state where the resin box 43B is kept inclined.

At this time, a corner portion formed by a radially inward end portion of each of the protruding walls 438B and a lower end of each of the engagement protruding walls 438Ba is brought into contact with a radially outward edge portion at a lower side of each of the engagement grooves 412B; thereby, the resin box 43B is restricted from moving radially inwardly relative to the radially inward flange 411B and is allowed to move radially outwardly. In addition, a radially inward side of the resin box 43B is supported from the lower side thereof by the radially inward flange 411B via the corner portion at the engagement protruding wall 438Ba. Thus, as indicated by an arrow in FIG. 9A, the resin box 43B may be rotated radially from an initial attachment position at the upper side in FIG. 9A to an attached position located at a lower side of the initial attachment position in FIG. 9A about the radially outward edge portion at the lower side of the engagement groove 412B in a condition where a radially inward position of the resin box 43B is determined as described above. In the midst of the rotation of the resin box 43B from the initial attachment position to the attached position as illustrated in FIG. 9A, the extending bottom portion 436 of the resin box 43B does not make contact with the high-voltage-side end portion 422 that is arranged so as to extend between the wire engagement portions 414.

As illustrated in FIG. 9B, when the resin box 43B moves downwardly, the inclined surface 436b formed at the protruding portion 436a of the extending bottom portion 436 of the resin box 43B starts contacting a radially outward edge portion of the flat surface 415Ba formed at the support portion 415B of the radially outward flange 413B. In accordance with the downward rotation of the resin box 43B, the inclined surface 436b slidably contacts the radially outward edge portion of the flat surface 415Ba and is thereafter engaged with the flat surface 415Ba. As a result, the resin box 43B is guided to move radially outwardly as indicated by an arrow in FIG. 9B.

As illustrated in FIG. 9C, at the radially outward side of the resin box 43B, the flat surface 415Ba is fully engaged with the inclined surface 436b in a state where the resin box 43B is completely moved to the attached position relative to the insulator 41B. In addition, the extending bottom portion 436 is supported from the lower side thereof by the flat surface 415Ba. Meanwhile, at the radially inward side of the resin box 43B, the lower ends of the bottom portion 435 in the circumferential direction are supported from the lower side thereof by the upper end of the radially inward flange 411B. In addition, at the radially inward side of the resin box 43B, the pair of engagement protruding walls 438Ba is inserted in the pair of engagement grooves 412B so as to be shallowly engaged therewith.

According to the second embodiment, in the midst of the rotation of the radially inward terminal-accommodating box 431 from the initial attachment position to the attached position, the engagement protruding walls 438Ba are inserted in and engaged with the engagement grooves 412B opened upward. Therefore, the radially inward terminal-accommodating box 431 is allowed to move upwardly and radially inwardly. Accordingly, in the midst of the attaching operation of the radially inward terminal-accommodating box 431 relative to the insulator 41B or after the radially inward terminal-accommodating box 431 is completely attached to the insulator 41B, the radially inward terminal-accommodating box 431 may be detached from the radially inward flange 411B of the insulator 41B. Except for such case, effects of the second embodiment are similar to those of the first embodiment and the description thereof is therefore omitted.

[Third embodiment] A third embodiment of the disclosure will be described as follows with reference to FIGS. 10A, 10B, and 10C. In the third embodiment, the split core 4 in the stator 1 according to the first embodiment is modified to a split core 4C corresponding to the core assembly. Other components and the like of the third embodiment are substantially the same as those of the first embodiment, and the description thereof is therefore omitted. In addition, components configuring the split core 4C and being the same as the components of the split core 4 in the stator 1 of the first embodiment are designated by the same reference numerals and the description thereof is partially omitted.

Figure 10A:
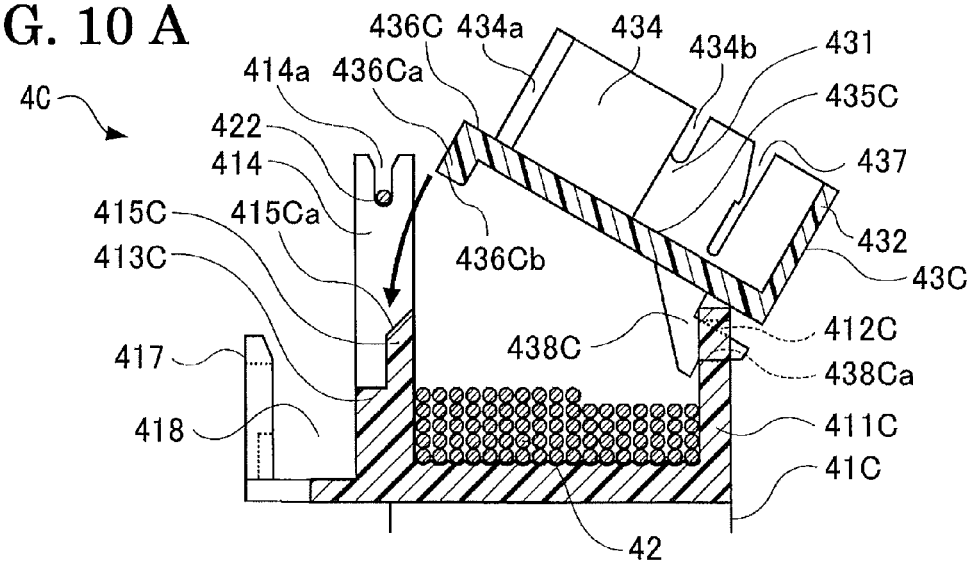
FIG. 10A is a cross sectional view illustrating a state of attaching the resin box to the split core of the stator of the rotary electrical machine according to a third embodiment disclosed here and showing a state where the resin box rotates downward from an initial attachment position to an attached position relative to the split core.

FIG. 10A illustrates a state where the resin box 43C rotates downwardly from an initial attachment position to an attached position. FIG. 10B illustrates a state where the resin box 43C is being guided to move radially outwardly. FIG. 10C illustrates a state where the resin box 43C is completely attached to an insulator 41C.

As illustrated in FIG. 100, a radially inward flange (radially inward extending portion) 411C extending in a vertical direction of a split core 4C and in the circumferential direction of the core unit 3, is formed at a portion of the insulator 41C, which is located at a radially inward end of the split core 4C. A pair of engagement holes (engagement receiving portions, radially inward engagement portions) 412C similar to the pair of engagement holes 412 of the first embodiment is formed at an upper portion of the radially inward flange 411C.

A radially outward flange (radially outward extending portion) 413C extending in the vertical direction of the split core 4C and in the circumferential direction of the core unit 3 so as to face radially outwardly relative the radially inward flange 411C, is formed at a portion of the insulator 41C, which is located at a radially outward end of the split core 4C. The pair of wire engagement portions 414 similar to those of the first embodiment is formed at an upper end portion of the radially outward flange 413C. The high-voltage-side end portion 422 of the coil 42 is arranged to extend between the pair of wire engagement portions 414. In addition, a support portion (radially outward engagement portion) 415C supporting a radially outward side of the resin box 43C from a lower side thereof is formed at the radially outward flange 413C so as to be arranged between the pair of wire engagement portions 414. The support portion 415C is positioned further radially inward than the support portion 415 of the first embodiment, which is shown in FIGS. 8A, 8B, and 8C. An inclined surface 415Ca similar to the inclined surface 415a of the first embodiment is formed at an upper end of the support portion 415C.

The resin box 43C includes the radially inward terminal-accommodating box 431 similar to that of the first embodiment. The resin box 43C according to the third embodiment includes a bottom portion 435C instead of the bottom portion 435 formed at the resin box 43 of the first embodiment. The resin box 43C further includes a pair of protruding walls (radially inward engaged portions) 438C and a pair of engagement protrusions (engagement protruding portions) 438Ca instead of the protruding walls 438, the engagement protrusions 438a, and the leg portions 439 that are formed at the resin box 43 in the first embodiment.

A protruding portion 436Ca protruding downwardly is formed at a radially outward end portion of an extending bottom portion (radially outward engaged portion) 436C of the bottom portion 435C. A flat surface (an engagement surface) 436Cb is formed at a lower end of the protruding portion 436Ca so as to face downward. The pair of protruding walls 438C protrudes in parallel to each other and downwardly form lower ends of the bottom portion 435C in the circumferential direction. Each of the engagement protrusions 438Ca is formed within a range from an upper end of each of the protruding walls 438C and to an intermediate portion in a vertical direction of the protruding wall 438C. The engagement protrusion 438Ca has the same wall thickness as the protruding wall 438C. The engagement protrusion 438Ca protrudes radially inwardly so as to have a protruding shape that is separated from the bottom portion 435C.

An attaching method to attach the resin box 43C to the insulator 41C (to attach the radially inward terminal-accommodating box 431 to the insulator 41C) will be described as follows. As illustrated in FIG. 10A, the pair of engagement protrusions 438Ca of the resin box 43C is deeply inserted in a movable manner into the pair of engagement holes 412C formed in the radially inward flange 411C of the insulator 41C, from the radially inward side to the radially outward side and from the upper side to the lower side in FIG. 10A in a state where the resin box 43C is kept inclined.

At this time, a corner portion formed by a radially inward end portion of each of the protruding walls 438C and a lower end of each of the engagement protrusions 438Ca is brought into contact with a radially outward edge portion at a lower side of each of the engagement holes 412C; thereby, the resin box 43C is restricted from moving radially inwardly relative to the radially inward flange 411C and is allowed to move radially outwardly. In addition, a radially inward side of the resin box 43C is supported from the lower side thereof by the radially inward flange 411C via the corner portion at the engagement protrusion 438Ca. Thus, as indicated by an arrow in FIG. 10A, the resin box 43C may be rotated radially from an initial attachment position located at the upper side in FIG. 10A to an attached position located at a lower side of the initial attachment position in FIG. 10A about the radially outward edge portion at the lower side of the engagement hole 412C in a condition where a radially inward position of the resin box 43C is determined as described above. In the midst of the rotation of the resin box 43C from the initial attachment position to the attached position as illustrated in FIG. 10A, the extending bottom portion 436C of the resin box 43C does not make contact with the high-voltage-side end portion 422 that is arranged so as to extend between the wire engagement portions 414.

Figure 10B:
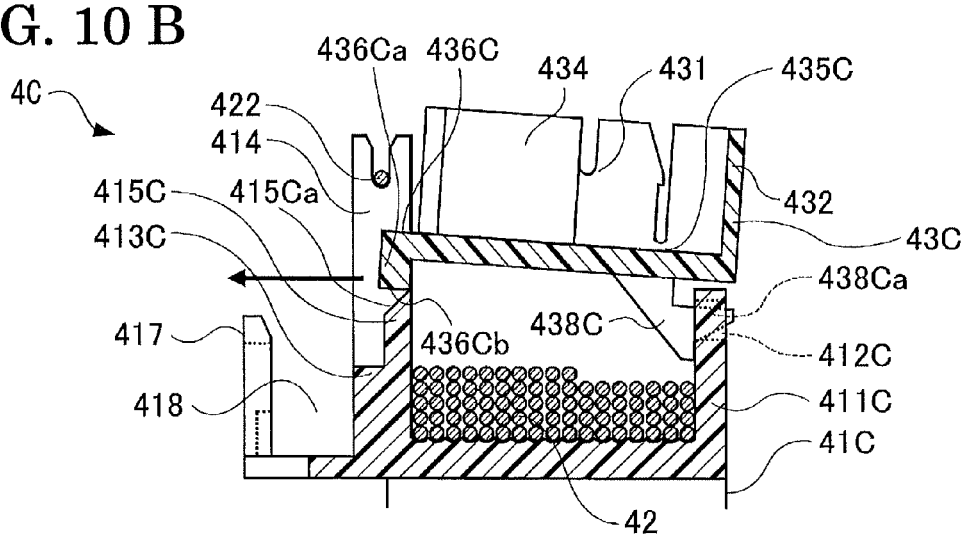
FIG. 10B is a cross sectional view illustrating a state where the resin box is being guided radially outwardly.
Figure 10C:
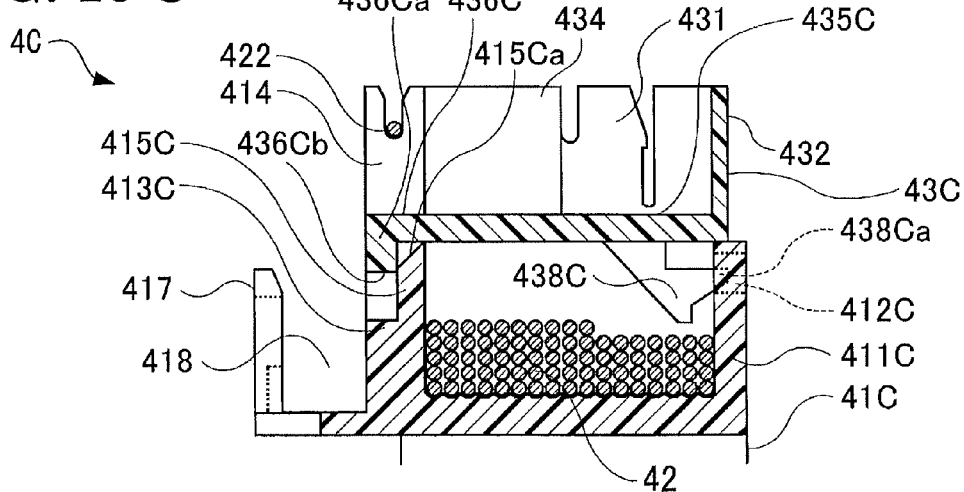
FIG. 10C is a cross sectional view illustrating a state where the resin box is completely attached to the split core.

As illustrated in FIG. 10B, when the resin box 43C moves downwardly, a radially inward edge portion of the flat surface 436Cb formed at the protruding portion 436Ca of the extending bottom portion 436C of the resin box 43C starts contacting the inclined surface 415Ca formed at the support portion 415C of the radially outward flange 413C. In accordance with the downward rotation of the resin box 43C, the flat surface 436Cb slidably contacts the radially inward edge portion of the inclined surface 415Ca and is thereafter engaged with the inclined surface 415Ca. As a result, the resin box 43C is guided to move radially outwardly as indicated by an arrow in FIG. 10B.

As illustrated in 10C, at the radially outward side of the resin box 43C, the inclined surface 415Ca is fully engaged with the flat surface 436Cb in a state where the resin box 43C is completely moved to the attached position relative to the insulator 41C. In addition, the extending bottom portion 436C is supported from a lower side thereof by the inclined surface 415Ca. Meanwhile, at the radially inward side of the resin box 43C, the lower ends of the bottom portion 435C in the circumferential direction are supported from a lower side thereof by an upper end of the radially inward flange 411C. In addition, at the radially inward side of the resin box 43C, the pair of engagement protrusions 438Ca is inserted in a movable manner into the pair of engagement holes 412C so as to be shallowly engaged therewith. Effects of the third embodiment are similar to those of the first embodiment, and the description thereof is therefore omitted.

[Fourth embodiment] A fourth embodiment of the disclosure will be described as follows with reference to FIG. 11. In the fourth embodiment, the split core 4 in the stator 1 according to the first embodiment is modified to a split core 4D corresponding to the core assembly. Other components and the like of the fourth embodiment are substantially the same as those of the first embodiment, and the description thereof is therefore omitted. In addition, components configuring the split core 4D and being the same as the components of the split core 4 in the stator 1 of the first embodiment are designated by the same reference numerals and the description thereof is partially omitted.

Figure 11:
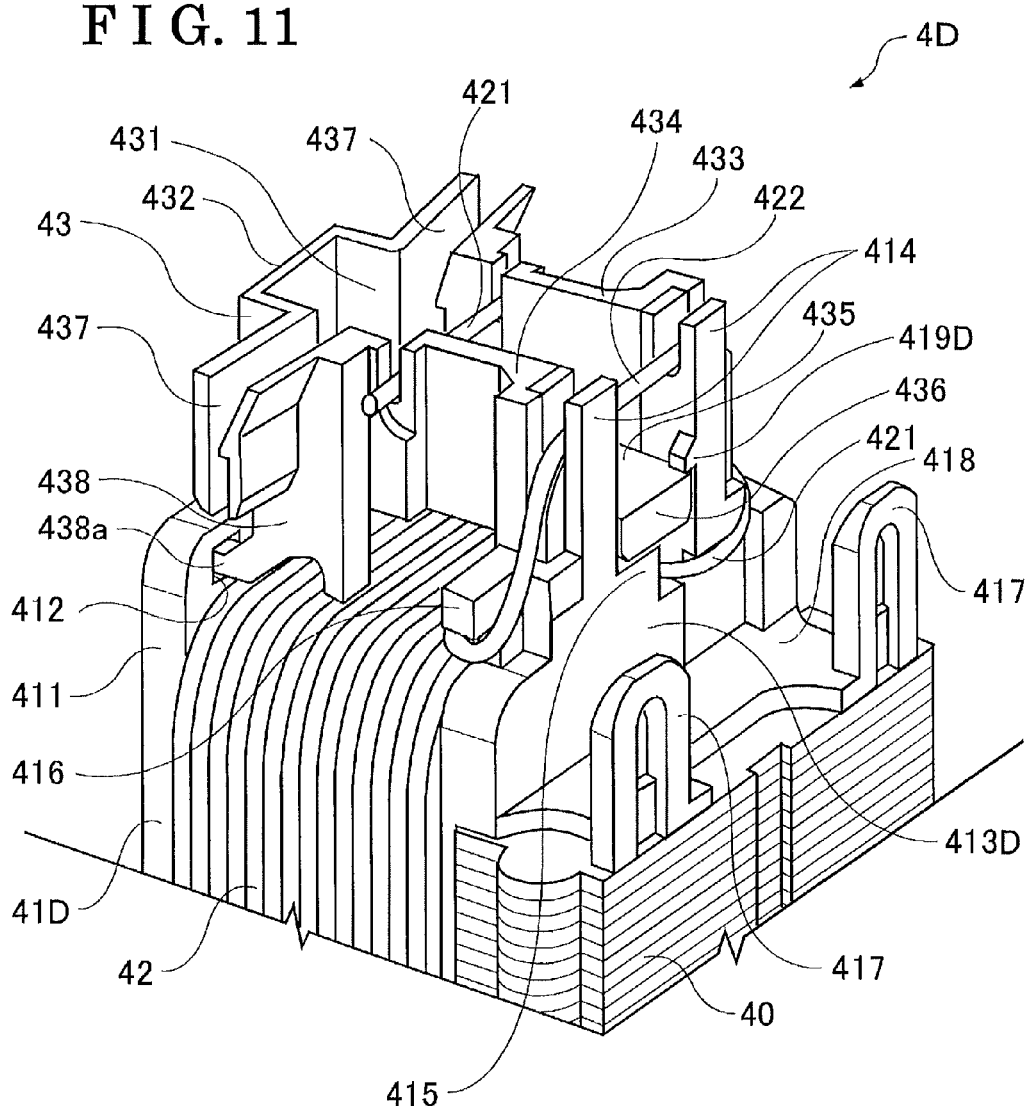
FIG. 11 is a perspective view of the split core of the rotary electrical machine according to a fourth embodiment disclosed here.
Figure 11:
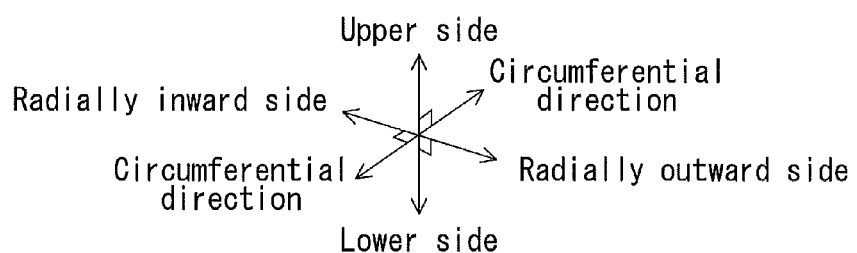
Figure 12:
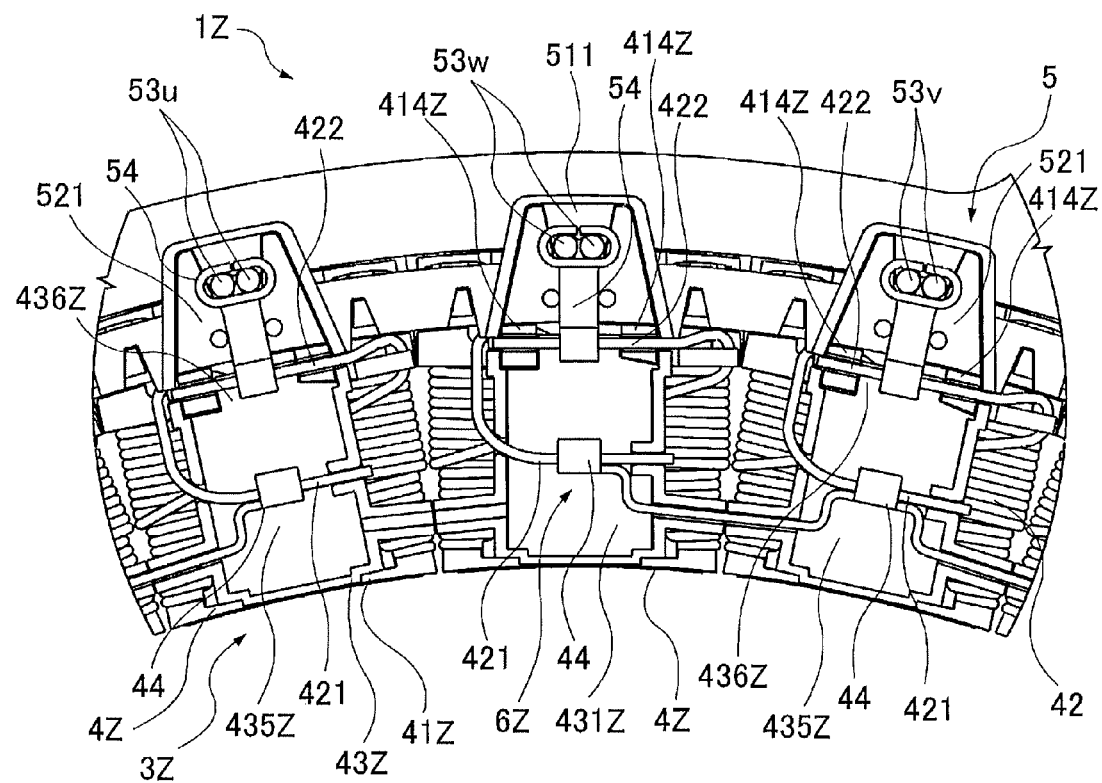
FIG. 12 is a partial plan view of a known stator of a rotary electrical machine.
Figure 13:
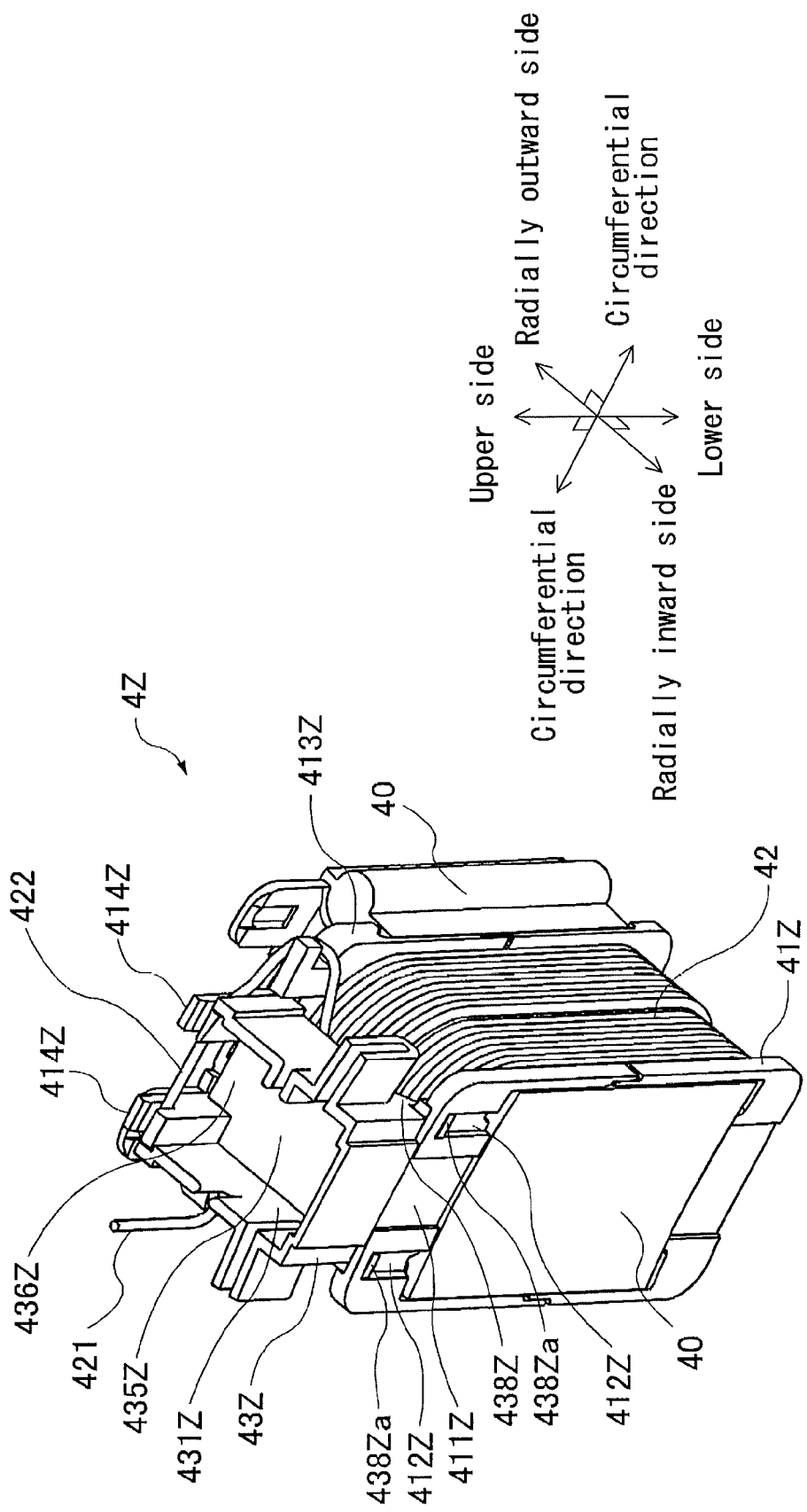
FIG. 13 is a perspective view of a split core of the known stator illustrated in FIG. 12.

As illustrated in FIG. 11, the split core 4D includes the laminated steel plate 40, an insulator 41D, the coil 42, and the resin box 43. Details of the laminated steel plate 40, the coil 42, and the resin box 43 according to the fourth embodiment are as explained in the first embodiment. The insulator 41D of the fourth embodiment differs from the insulator 41 of the first embodiment in that a holding protrusion (holding portion) 419D is provided.

As illustrated in FIG. 11, the holding protrusion 419D is formed at one of the pair of wire engagement portions 414 of a radially outward flange 413D (the radially outward extending portion) of the insulator 41D. In the fourth embodiment, the holding protrusion 419D is formed at the wire engagement portion 414 arranged at the side wall 433 of the resin box 43 so as to be provided at an inner surface of the wire engagement portion 414 in the circumferential direction and so as to protrude toward the wire engagement portion 414 arranged at the side wall 434 of the resin box 43.

Further, the holding protrusion 419D is formed so as to have a trapezoidal shape including an inclined surface at an upper side and a flat surface at a lower side when viewed from a radially outward side of the split core 4D. The inclined surface is inclined obliquely downwardly in the circumferential direction when viewed from the radially outward side of the split core 4D. In a state where the resin box 43 is attached to the insulator 41D as illustrated in FIG. 11, the flat surface at the lower side of the holding protrusion 419D is in contact with an upper surface of the extending bottom portion 436 of the resin box 43. The holding protrusion 419D partially overlaps the extending bottom portion 436 when viewed from the upper side in FIG. 11. Therefore, the resin box 43 is held by the holding protrusion 419D so as not to rotate upward from the attached position to the initial attachment position.

In the case of attaching the resin box 43 to the insulator 41D, a lower portion of the extending bottom portion 436 makes contact with the inclined surface of the holding protrusion 419D, which is located at the upper side thereof, in the midst of the rotation of the resin box 43 from the initial attachment position to the attached position. Each of the resin box 43 and the insulator 41D is formed of a synthetic resin material, and an elastic deformation of the resin box 43 and the insulator 41D is slightly allowed. Accordingly, the resin box 43 may be moved further downward from a state where the extending bottom portion 436 is in contact with the holding protrusion 419D. In accordance with the rotation of the resin box 43, the extending bottom portion 436 slidably contacts the holding protrusion 419D while moving from the upper side to the lower side of the holding protrusion 419D; thereafter, the resin box 43 is moved to the attached position relative to the insulator 41D as illustrated in FIG. 11.

According to the fourth embodiment, in a state where the resin box 43 including the radially inward terminal-accommodating box 431 to an upper portion of the insulator 41D, the radially inward terminal-accommodating box 431 is held by the holding protrusion 419D formed at the radially outward flange 413D of the insulator 41D, so as not to rotate radially. Therefore, according to the fourth embodiment, the radially inward terminal-accommodating box 431 is restricted from being detached from the radially outward flange 413D. As a result, the radially inward terminal-accommodating box 431 may be surely held in the attached position. Other effects of the fourth embodiment are similar to those of the first embodiment, and the description thereof is therefore omitted.

[Modified examples of the first, second, and third embodiments] The stator of the rotary electrical machine of the disclosure is not limited to the aforementioned embodiments and may be modified as follows.

For example, in the stator of the rotary electrical machine of the disclosure, the radially inward engaged portion formed at the radially inward terminal-accommodating box may be configured in a different manner from the configuration of the radially inward engaged portion (the protruding wall 438, 438B, 438C) according to the first, second, and third embodiments). In addition, in the stator of the rotary electrical machine of the disclosure, the radially inward engagement portion formed at the radially inward extending portion of the insulator may be configured in a different manner from the configuration of the radially inward engagement portion according to the first, second, and third embodiments (the engagement hole 412, 412C of the first and third embodiments and the engagement groove 412B of the second embodiment). The radially inward engaged portion and the radially inward engagement portion may be configured in various manners as long as the radially inward engaged portion and the radially inward engagement portion are configured to engage each other so as to be a rotation center about which the radially inward terminal-accommodating box 431 rotates in the radial direction of the core unit 3 from the initial attachment position to the attached position and so as to move the radially inward terminal-accommodating box 431 relative to the insulator 41, 41B, 41C in the radial direction. For example, the stator 1 according to the first embodiment includes pair of protruding walls 438 and the pair of engagement holes 412 in the circumferential direction. Alternatively, the stator 1 may be configured to include the single protruding wall 438 in the circumferential direction and the single engagement hole 412 in the circumferential direction.

Further, for example, in the stator of the rotary electrical machine of the disclosure, the radially outward engaged portion formed at the radially inward terminal-accommodating box may be configured in a different manner from the configuration of the radially outward engaged portion according to the first, second, and third embodiments (the extending bottom portion 436 of the first and second embodiments, the extending bottom portion 436C). In addition, in the stator of the rotary electrical machine of the disclosure, the radially outward engagement portion formed at the radially outward extending portion of the insulator may be configured in a different manner from the configuration of the radially outward engagement portion (the support portion 415, 415B, 415C) according to the first, second, and third embodiments. The radially outward engaged portion and the radially outward engagement portion may be configured in various manners as long as the radially outward engagement portion is configured to engage with the radially outward engaged portion in accordance with the rotation of the radially inward terminal-accommodating box and thereby moves the radially inward terminal-accommodating box toward the radially outward terminal-accommodating box in the radial direction. For example, the stator 1 according to the first embodiment includes the extending bottom portion 436 serving as the radially outward engaged portion. Alternatively, in the stator 1 according to the first embodiment, the stepped portions 433a, 434a formed at the side walls 433, 434 of the radially inward terminal-accommodating box 431 may be modified to the radially outward engaged portions.

Furthermore, for example, in the first, second, third, and fourth embodiments, the insulating resin material 7 may be filled in the terminal accommodating box 6 in a state where one of the connected portion between the neutral point terminal 44 and the low-voltage-side end portion 421 of the coil 42 and the connected portion between the electricity supply terminal 54 and the high-voltage-side end portion 422 of the coil 42 is accommodated in the terminal accommodating box 6. In addition, according to the first embodiment, a method to put the insulating resin material 7 in the terminal accommodating box 6 is conducted by filling the terminal accommodating box 6 with the insulating resin material 7. Alternatively, a method to put the insulating resin material 7 in the terminal accommodating box 6 may be conducted by applying the insulating resin material 7 to the terminal accommodating box 6.

The stator 1 according to the aforementioned embodiments may be applied to a synchronous motor, an induction motor, a direct current motor, and another rotary electrical machine.

As described above, according to the aforementioned embodiments, the stator 1 of the rotary electrical machine includes the core unit 3 configured by the plural split cores 4, 4B, 4C, 4D arranged in the annular shape, each of the split cores 4, 4B, 4C, 4D including the laminated steel plate 40, the insulator 41, 41B, 41C, 41D insulating a portion of the laminated steel plate 40, and the coil 42 wound around the insulator 41, 41B, 41C, 41D; the bus ring 5 formed in the annular shape to face the core unit 3, the bus ring 5 supplying an electric power to the coil 42; and the radially inward terminal-accommodating box 431 arranged at the insulator 41, 41B, 41C, 41D, accommodating the low-voltage-side end portion 421 of the coil 42, and including the radially inward engaged portions 438, 438B, 438C and the radially outward engaged portion 436, 436C, the stator 1 generating a rotating magnetic field when the electric power is applied to the coil 42, the insulator 41, 41B, 41C, 41D including the radially inward flange 411, 411B, 411C and the radially outward flange 413, 413B, 413C, 413D positioned at the radially inward and outward sides of the core unit 3 relative to the coil 42 in an extending manner to support the radially inward terminal-accommodating box 431, the radially inward flange 411, 411B, 411C including the radially inward engagement portions 412, 412B, 412C which serve as the rotation center about which the radially inward terminal-accommodating box 431 rotates in the radial direction of the core unit 3 from the initial attachment position to the attached position and which engage with the radially inward engaged portions 438, 438B, 438C so that the radially inward terminal-accommodating box 431 is movable relative to the insulator 41, 41B, 41C, 41D in the radial direction of the core unit 3 in a state where the radially inward terminal-accommodating box 431 is in the attached position, the radially outward flange 413, 413B, 413C, 413D including the radially outward engagement portion 415, 415B, 415C which engages with the radially outward engaged portion 436, 436C in accordance with the rotation of the radially inward terminal-accommodating box 431 to move the radially inward terminal-accommodating box 431 in the radial direction.

According to the stator 1 of the rotary electrical machine according to the aforementioned embodiments, each of the radially inward engaged portions 438, 438B, 438C of the radially inward terminal-accommodating box 431 is engaged with each of the radially inward engagement portions 412, 412B, 412C of the insulator 41, 41B, 41C, 41D; thereafter, the radially inward terminal-accommodating box 431 is rotated from the initial attachment position to the attached position in a state where the radially inward position of the radially inward terminal-accommodating box 431 is determined. Therefore, the radially outward engaged portion 436, 436C of the radially inward terminal-accommodating box 431 engages with the radially outward engagement portion 415, 415B, 415C of the insulator 41, 41B, 41C, 41D in accordance with the rotation of the radially inward terminal-accommodating box 431 and the radially inward terminal-accommodating box 431 is therefore guided to move radially toward the radially outward terminal-accommodating box 511. As a result, the radially inward terminal-accommodating box 431 and the radially outward terminal-accommodating box 511 may be arranged adjacent to one another in a state where the radially inward terminal-accommodating box 431 is in the attached position.

According to the stator 1 of the aforementioned embodiments, for example, the insulating resin material 7 is filled in the terminal accommodating boxes 6 each formed by the radially outward terminal-accommodating box 511 and the radially inward terminal-accommodating box 431 that is rotated to the attached position and that is arranged adjacent to the radially outward terminal-accommodating box 511 by the engagement of the radially outward engaged portion 436, 436C with the radially outward engagement portion 415, 415B, 415C. At this time, a clearance from which the insulating resin material 7 may flow is generated between the radially inward terminal-accommodating box 431 and the radially outward terminal-accommodating box 511 until just before the radially inward terminal-accommodating box 431 is rotated to the attached position. Even in such case, the radially inward terminal-accommodating box 431 is rotated to the attached position and therefore moves radially toward the radially outward terminal-accommodating box 511. As a result, the clearance is reduced. Thus, in the case of attaching the radially inward terminal-accommodating box 431 to the insulator 41, 41B, 41C, 41D, a contact of the radially inward terminal-accommodating box 431 with the radially outward terminal-accommodating box 511 is of no concern and the radially inward terminal-accommodating box 431 may be easily attached to the insulator 41, 41B, 41C, 41D. Further, in a state where the radially inward terminal-accommodating box 431 is attached to the insulator 41, 41B, 41C, 41D, the radially inward terminal-accommodating box 431 and the radially outward terminal-accommodating box 511 are positioned adjacent to one another. As a result, the insulating resin material 7 does not flow out from the bottom portion of the terminal accommodating box 6 and the like at the timing of filling the insulating resin material 7 in the terminal accommodating boxes 6.

Furthermore, as disclosed in the known stator 1Z disclosed in Reference 2, for example, the attaching operation of the radially inward terminal-accommodating box 431Z to the insulator 41Z is conducted in a state where the high-voltage-side end portion 422 of the coil 42 is positioned to extend between the pair of wire engagement portions 414Z. Even in such case, according to the aforementioned embodiments, the radially inward terminal-accommodating box 431 may be rotated from the initial attachment position to the attached position without concern for a contact of the bottom portion 435, 435C of the radially inward terminal-accommodating box 431 with the high-voltage-side end portion 422. That is, for example, the low-voltage-side end portion 421 or the high-voltage-side end portion 422 of the coil 42 is arranged at the radially inward terminal-accommodating box 431, which is adjacent to a boundary line between the bottom portion 435, 435C of the radially inward terminal-accommodating box 431 and the bottom portion of the radially outward terminal-accommodating box 511, and the low-voltage-side end portion 421 or the high-voltage-side end portion 422 of the coil 42 is positioned in parallel with the boundary line. Even in such case, according to the configuration of the stator 1 of the aforementioned embodiments, the radially inward terminal-accommodating box 431 may be easily attached to the insulator 41, 41B, 41C, 41D.

According to the aforementioned embodiments, the inclined surface 436b and 415a, 415Ca is formed at one of the radially outward engaged portion 436 of the radially inward terminal-accommodating box 431 and the radially outward engagement portion 415, 415C of the radially outward flange 413, 413C. The inclined surface 436b and 415a, 415Ca is inclined toward the radially inward side as being away from the coil 42. The flat surface 436Cb, 415Ba is formed at the other of the radially outward engaged portion 436C of the radially inward terminal-accommodating box 431 and the radially outward engagement portion 415B of the radially outward flange 413B. The flat surface 436Cb, 415Ba slidably contacts the inclined surface 415Ca, 436b in accordance with the rotation of the radially inward terminal-accommodating box 431 to the attached position to be engaged with the inclined surface 415Ca, 436b.

According to the aforementioned configuration, when the radially inward terminal-accommodating box 431 comes closer to the coil 42 while rotating to the attached position, the radially outward engaged portion 436, 436C is guided in a direction of the inclined surface 415a, 436b, 415Ca toward the radially outward side at which the radially inward terminal-accommodating box 431 is positioned adjacent to the coil 42. Thus, according to the stator 1 of the aforementioned embodiments, in accordance with the rotation of the radially inward terminal-accommodating box 431, the radially inward terminal-accommodating box 431 may be moved radially toward the radially outward terminal-accommodating box 511 by a simple configuration.

According to the aforementioned embodiments, the bottom portion 435, 435C of the radially inward terminal-accommodating box 431 includes the extending bottom portion 436, 436C arranged at the radially outward side, protruding from the bottom portion 435, 435C, and forming the radially outward engaged portion 436, 436C. The radially outward flange 413, 413B, 413C, 413D includes the support portion 415, 415B, 415C contacting the extending bottom portion 436, 436C to support the radially inward terminal-accommodating box 431 in the attached position. The support portion 415, 415B, 415C forms the radially outward engagement portion 415, 415B, 415C.

According to the aforementioned configuration, the support portion 415, 415B, 415C is brought into contact with the extending bottom portion 436, 436C; thereby, the radially inward terminal-accommodating box 431 is supported in the attached position. Thus, two members of the extending bottom portion 436, 436C and the support portion 415, 415B, 415C may easily or simply establish the engagement between the radially outward engaged portion 436, 436C and the radially outward engagement portion 415, 415B, 415C and may support the radially outward side of the bottom portion 435, 435C of the radially inward terminal-accommodating box 431.

According to the aforementioned embodiments, the radially inward engaged portion 438, 438B, 438C of the radially inward terminal-accommodating box 431 includes the protruding wall 438, 438B, 438C protruding from the bottom portion 435, 435C of the radially inward terminal-accommodating box 431 toward the coil 42 and the engagement protruding portion 438a, 438Ba, 438Ca provided at the protruding wall 438, 438B, 438C to protrude therefrom inwardly in the radial direction. The radially inward engagement portion 412, 412B, 412C of the radially inward flange 411, 411B, 411C is configured to be engageable with the engagement protruding portion 438a, 438Ba, 438Ca. The radially inward engagement portion 412, 412B, 412C includes the engagement receiving portion 412, 412B, 412C which supports the radially inward terminal-accommodating box 431 to be movable in the radial direction by restricting the radially inward terminal-accommodating box 431 from moving toward the radially inward side relative to the radially inward flange 411, 411B, 411C and by allowing the radially inward terminal-accommodating box 431 to move toward the radially outward side.

According to the stator 1 of the aforementioned embodiments, the engagement protruding portion 438a, 438Ba, 438Ca protruding inwardly in the radial direction of the core unit 3 from the protruding wall 438, 438B, 438C formed at the radially inward terminal-accommodating box 431 is inserted in and engaged with the engagement receiving portion 412, 412B, 412C included in the radially inward engagement portion 412, 412B, 412C of the radially inward flange 411, 411B, 411C. Therefore, the engagement protruding portion 438a, 438Ba, 438Ca is allowed to move only in the radial direction by the engagement receiving portion 412, 412B, 412C. Here, for example, an end portion of the engagement protruding portion 438a, 438Ba, 438Ca or the protruding wall 438, 438B, 438C is shaped so to be non-insertable in the engagement receiving portion 412, 412B, 412C. In such case, according to the radially inward engaged portion 438, 438B, 438C simply configured as described above and the radially inward engagement portion 412, 412B, 412C simply configured as described above, the radially inward terminal-accommodating box 431 is restricted from moving radially inwardly relative to the radially inward flange 411, 411B, 411C and is allowed to move radially outwardly from the radially inward flange 411, 411B, 411C. Further, for example, the engagement protruding portion 438a, 438Ba, 438Ca may rotate within the engagement receiving portion 412, 412B, 412C in a state where the radially inward terminal-accommodating box 431 is restricted from moving radially inwardly relative to the radially inward flange 411, 411B, 411C. In such case, according to the radially inward engaged portion 438, 438B, 438C simply configured as described above and the radially inward engagement portion 412, 412B, 412C simply configured as described above, the radially inward terminal-accommodating box 431 may rotate in the radial direction.

According to the aforementioned embodiments, the engagement protrusion (the engagement protruding portion) 438a, 438Ca includes the protruding shape that is separated from the bottom portion 435, 435C of the radially inward terminal-accommodating box 431. The engagement receiving portion 412, 412C is the engagement hole 412, 412C which is formed at the radially inward flange 411, 411C so as to penetrate therethrough and in which the engagement protrusion 438a, 438Ca is insertable.

According to the aforementioned configuration, the engagement protrusion 438a, 438Ca is restricted from moving toward the central axis of the core unit 3. Therefore, the radially inward terminal-accommodating box 431 is restricted from loosening from the radially inward flange 411, 411C. As a result, the radially inward terminal-accommodating box 431 may be appropriately attached to the insulator 41, 41C and may be surely held in the attached position.

According to the aforementioned fourth embodiment, the radially outward flange 413D includes the holding protrusion 419D holding the radially inward terminal-accommodating box 431 so that the radially inward terminal-accommodating box 431 is inhibited from rotating in the radial direction toward the initial attachment position in a state where the radially inward terminal-accommodating box 431 is in the attached position.

According to the aforementioned configuration, the radially inward terminal-accommodating box 431 is restricted from loosening from the radially outward flange 413D, therefore being surely held in the attached position.

According to the aforementioned embodiments, the radially inward terminal-accommodating box 431 is filled with the insulating resin material 7 in a state where the low-voltage-side end portion 421 of the coil 42 is accommodated in the radially inward terminal-accommodating box 431.

According to the stator 1 of the aforementioned embodiments, the insulating resin material 7 is filled in each of the terminal accommodating boxes 6 in a state where one of the connected portion between the neutral point terminal 44 and the low-voltage-side end portion 421 of the coil 42 and the connected portion between the electricity supply terminal 54 and the high-voltage-side end portion 422 of the coil 42 is accommodated in the terminal accommodating box 6. Here, as described above, the insulating resin material 7 does not flow out from the bottom portion of the terminal accommodating box 6 and the like. As a result, according to the embodiments, the aforementioned connected portions are surely covered by the insulating resin material 7 and may be therefore insulated.

The principles, preferred embodiment and mode of operation of the present have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stator of a rotary electrical machine, comprising:
a core unit configured by a plurality of core assemblies arranged in an annular shape, each of the core assemblies including a laminated steel plate, an insulator insulating a portion of the laminated steel plate, and a coil wound around the insulator;
a bus ring formed in an annular shape to face the core unit, the bus ring supplying an electric power to the coil; and
an accommodating box arranged at the insulator, accommodating an end portion of the coil, and including a radially inward engaged portion and a radially outward engaged portion,
the stator generating a rotating magnetic field when the electric power is applied to the coil,
the insulator including radially inward and outward extending portions positioned at radially inward and outward sides of the core unit relative to the coil in an extending manner to support the accommodating box,
the radially inward extending portion including a radially inward engagement portion which serves as a rotation center about which the accommodating box rotates in a radial direction of the core unit from an initial attachment position to an attached position, and which engages with the radially inward engaged portion so that the accommodating box is movable relative to the insulator in the radial direction of the core unit in a state where the accommodating box is in the attached position,
the radially outward extending portion including a radially outward engagement portion which engages with the radially outward engaged portion in accordance with the rotation of the accommodating box;
wherein an inclined surface is formed at one of the radially outward engaged portion of the accommodating box and the radially outward engagement portion of the radially outward extending portion, the inclined surface being inclined toward the radially inward side as being away from the coil, and an engagement surface is formed at the other of the radially outward engaged portion of the accommodating box and the radially outward engagement portion of the radially outward extending portion, the engagement surface slidably contacting the inclined surface in accordance with the rotation of the accommodating box to the attached position to be engaged with the inclined surface.

2. The stator according to claim 1, wherein a bottom portion of the accommodating box includes an extending bottom portion arranged at the radially outward side, protruding from the bottom portion, and forming the radially outward engaged portion, and
wherein the radially outward extending portion includes a support portion contacting the extending bottom portion to support the accommodating box in the attached position, the support portion forming the radially outward engagement portion.

3. The stator according to claim 1, wherein the radially inward engaged portion of the accommodating box includes a protruding wall protruding from the bottom portion of the accommodating box toward the coil and an engagement protruding portion provided at the protruding wall to protrude therefrom inwardly in the radial direction, and
wherein the radially inward engagement portion of the radially inward extending portion is configured to be engageable with the engagement protruding portion, the radially inward engagement portion including an engagement receiving portion which supports the accommodating box to be movable in the radial direction by restricting the accommodating box from moving toward the radially inward side relative to the radially inward extending portion and by allowing the accommodating box to move toward the radially outward side.

4. The stator according to claim 3, wherein the engagement protruding portion includes a protruding shape that is separated from the bottom portion of the accommodating box, and the engagement receiving portion is an engagement hole which is formed at the radially inward extending portion so as to penetrate therethrough and in which the engagement protruding portion is insertable.

5. The stator according to claim 1, wherein the radially outward extending portion includes a holding portion holding the accommodating box so that the accommodating box is inhibited from rotating in the radial direction toward the initial attachment position in a state where the accommodating box is in the attached position.

6. The stator according to claim 1, wherein the accommodating box is filled with an insulating resin material in a state where the end portion of the coil is accommodated in the accommodating box.

* * * * *